United States Patent [19]
Beshai et al.

[11] Patent Number: 6,088,331
[45] Date of Patent: Jul. 11, 2000

[54] PARALLEL SERVICE-RATE CONTROLLERS IN ATM SWITCHES

[75] Inventors: Maged E. Beshai, Stittsville; Stacy W. Nichols, Kanata, both of Canada

[73] Assignee: Nortel Networks Corporation, Montreal, Canada

[21] Appl. No.: 08/834,974

[22] Filed: Apr. 7, 1997

[51] Int. Cl.[7] .................................................. H04J 3/14
[52] U.S. Cl. ................................... 370/232; 370/416
[58] Field of Search .................................. 370/229, 230, 370/231, 232, 233, 234, 235, 236, 237, 238, 412, 414, 416, 418

[56] References Cited

U.S. PATENT DOCUMENTS

| | | | |
|---|---|---|---|
| 5,231,633 | 7/1993 | Hluchyj et al. | 370/418 |
| 5,649,110 | 7/1997 | Ben-Nun et al. | 370/416 |

FOREIGN PATENT DOCUMENTS 0 684 717  11/1995  European Pat. Off. ........ H04L 12/56

OTHER PUBLICATIONS

Hui Zhang et al., "Comparison of Rate–Based Service Disciplines", Computer Communications Review, vol. 21, No. 4, Sep. 1, 1991, pp. 113–121.

Spiram, K., "Methodologies For Bandwidth Allocation, Transmission Scheduling, and Congestion Avoidance in Broadband ATM Networks", Computer Networks and ISDN Systems, vol. 26, No. 1, Sep. 1, 1993, pp. 43–59.

*Primary Examiner*—Huy D. Vu
*Attorney, Agent, or Firm*—Gowling, Strathy & Henderson; Yoshiharu Toyooka

[57] ABSTRACT

Techniques of service-rate controls in ATM switches are described, and apparatus for their implementation are devised. The techniques fall in two categories: frequency domain controls, and time-domain controls. The regulators control the service rate on a per-class basis or on a per-connection basis. Some class regulators operate at very high speeds of the order of several gigabits per second and cover a medium number of classes, 32 for example. Other regulators operate at high speeds of the order of several-hundred megabits per second, and cover a very large number of classes, e.g., 10000. A compound regulator which combines both types of regulators is also described. The compound regulators extend the range of controllable classes considerably, covering some 200,000 classes. The main advantages of the regulators of the invention are simplicity, robustness, and high performance.

30 Claims, 25 Drawing Sheets

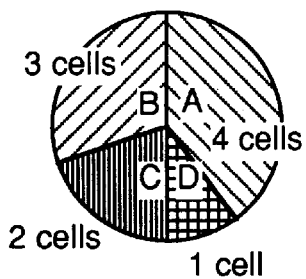
Fig 1
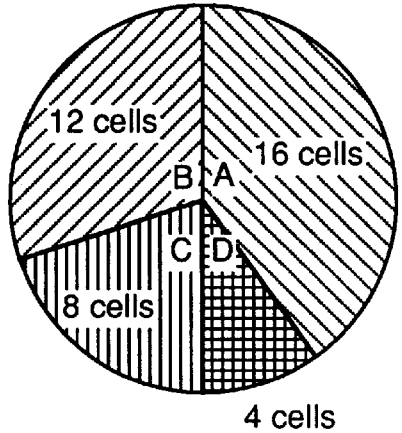
Fig 2
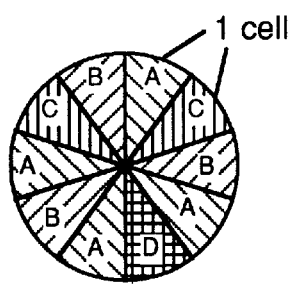
Fig 3
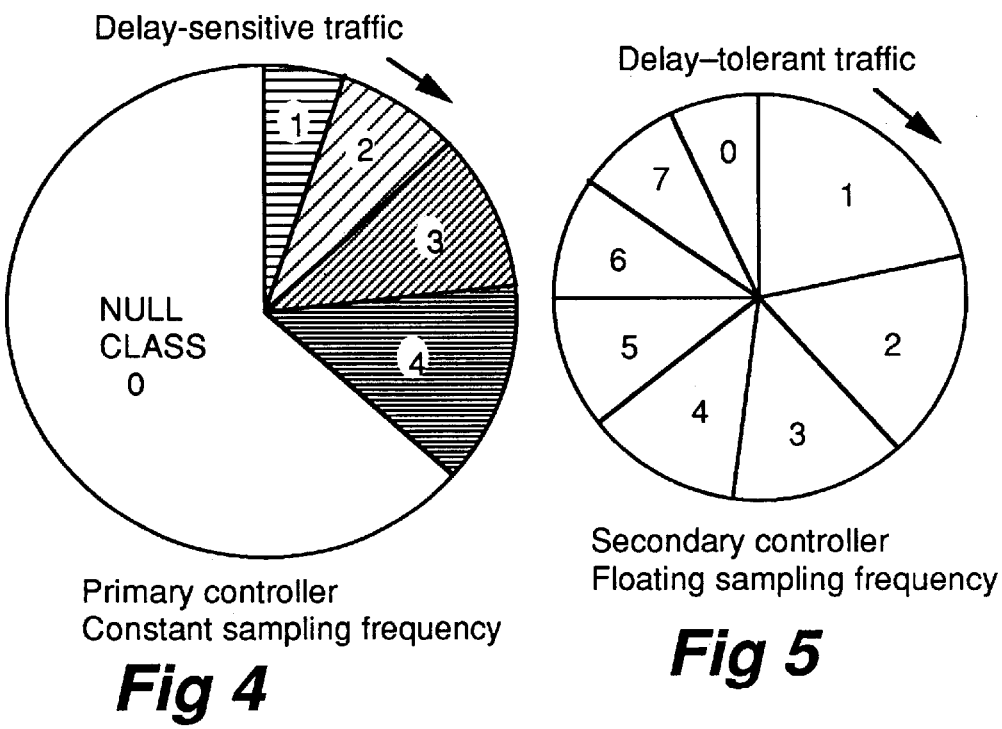
Primary controller
Constant sampling frequency
Fig 4
Secondary controller
Floating sampling frequency
Fig 5

```
 0  000    010011
 1  001    010011
 2  010  ─ 010011 100110
 3  011           100110
 4  100  ──────── 100110 111001
 5  101                  111001                    overflow
 6  110                  111001                   /
 7  111  ───────────────  111001 001100
 8  000                          001100
 9  001  ──────────────────────  001100 011111
10  010                                 011111
11  011  ─────────────────────────────  011111 110010
12  100                                        110010
13  101                                        110010                overflow
14  110  ──────────────────────────────────── 110010 000101         /
15  111                                              000101
16  000  ────────────────────────────────────────── 000101 011000
17  001                                                    011000
18  010                                                    011000
19  011  ──────────────────────────────────────────────── 011000 101011
20  100
```

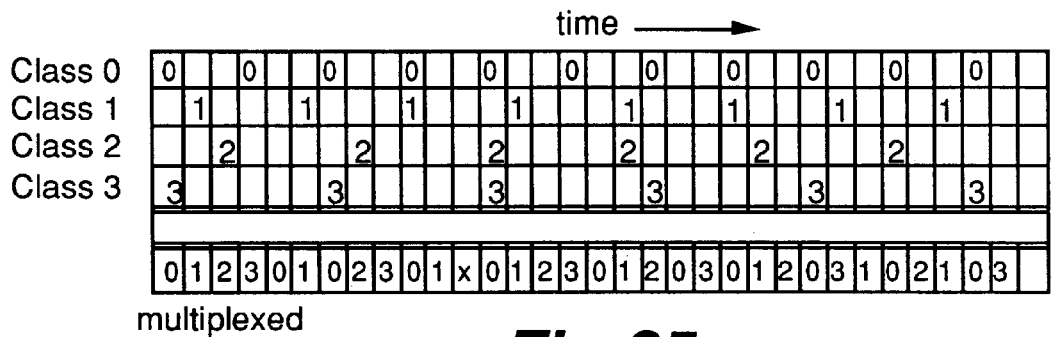
Fig 25
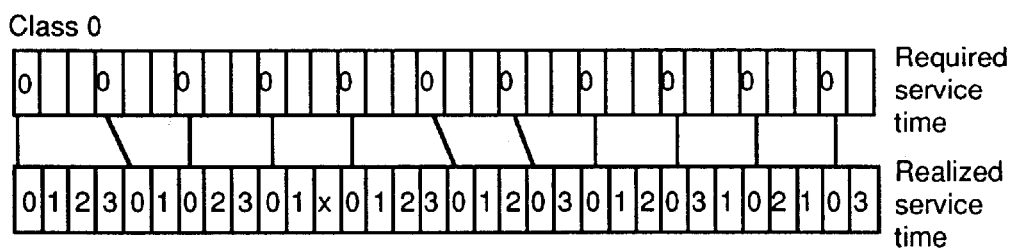
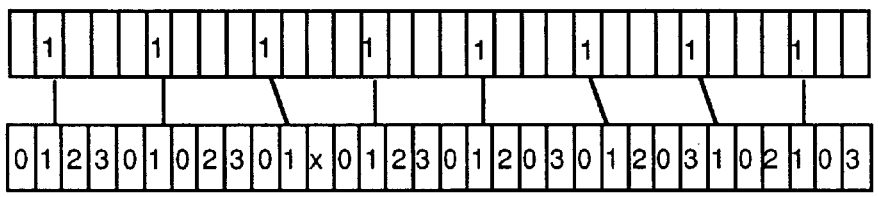
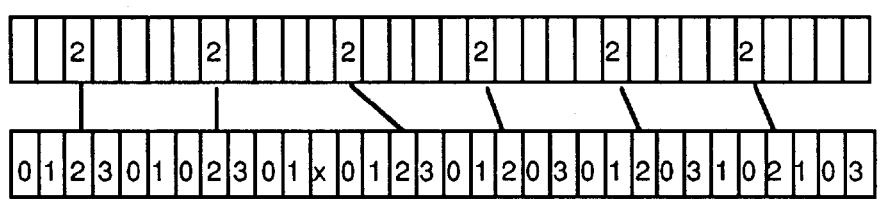
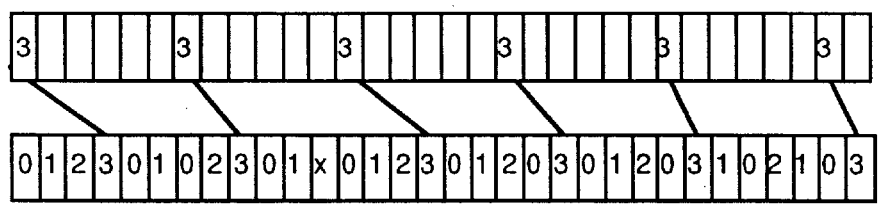
Fig 26

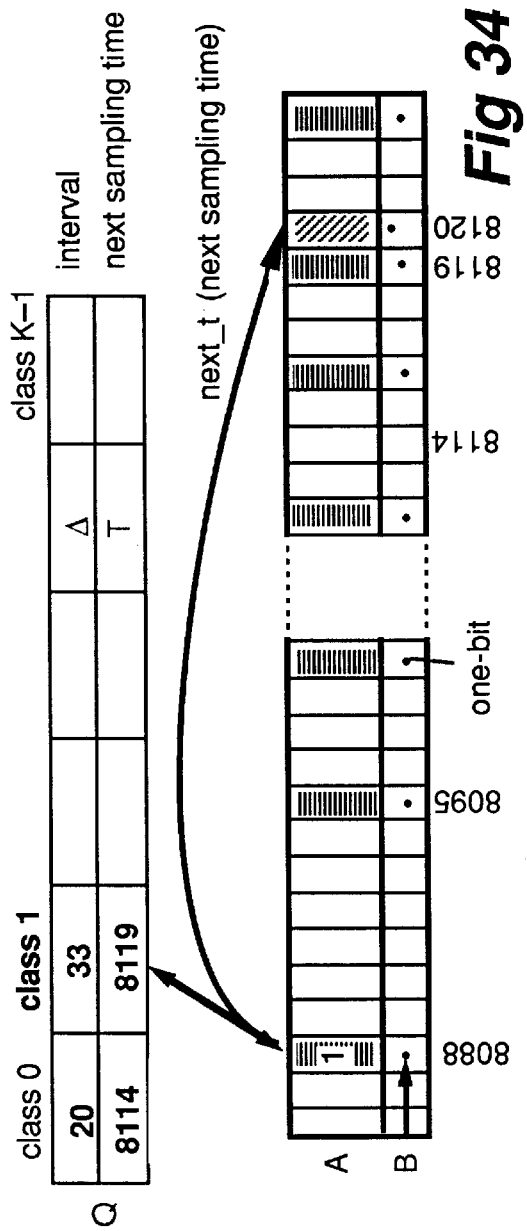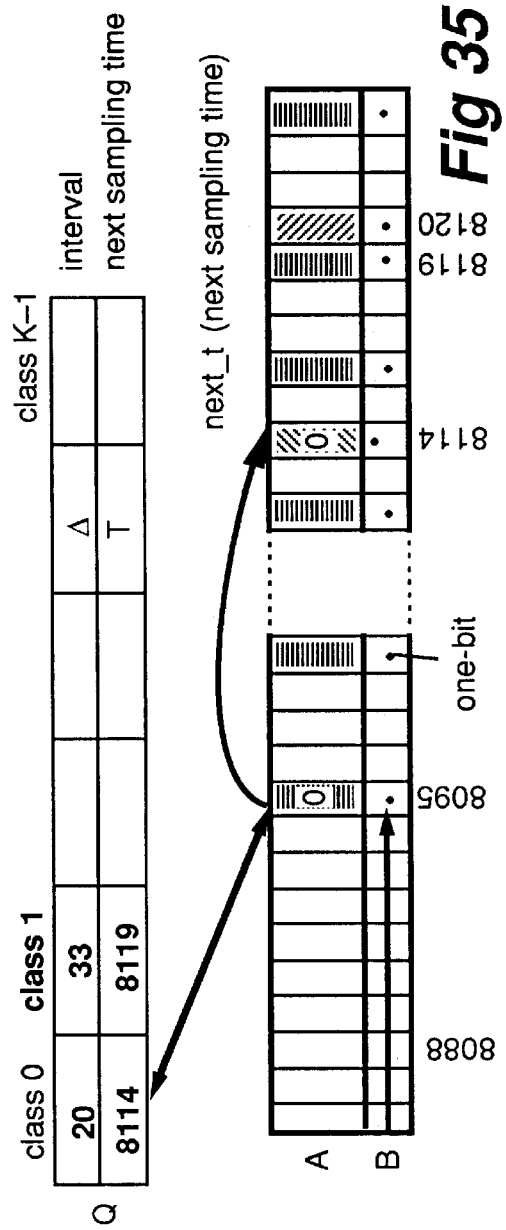

PARALLEL SERVICE-RATE CONTROLLERS IN ATM SWITCHES

FIELD OF THE INVENTION

The present invention resides in the field of service-rate control in ATM switches. In particular, it is directed to a rate control method and apparatus in frequency-domain or time-domain, operating at very high speeds and/or covering a large number of service classes.

BACKGROUND OF THE INVENTION

Service-rate discipline comes naturally in synchronous circuit-switching. In ATM, service rate controllers are needed to regulate the service rate for connections or classes of connections. A class may include several connections of similar traffic descriptors, or may represent a single connection of a high bit rate.

Some of the requirements of the service-rate controller are:

high capacity (large number of classes)
high performance (low jitter)
high speed
simplicity/low cost
robustness: low error probability/easy error recovery.

The controller may be either frequency domain based, where the main controller parameter is the sampling rate per class, or time-domain based, where the main controller parameter is the sampling interval per class.

The generic problem of service rate control may be stated as follows: a link of fixed capacity is shared by a number of traffic streams which are allocated separate queues. The streams may share the link according to one of many policies, such as a fixed rate per stream, or a guaranteed minimum rate per stream. In any of these policies, the maximum number of cells that a queue may transfer to the link in a single transaction (i.e., in a contiguous period) may be limited to a predetermined bound. The use of large bounds has the advantage of simplifying the rate-control implementation, at the expense of increasing the cell-delay variation. The schemes depicted in FIGS. 1 and 2, show the use of contiguous allocations for an example of four queues for four traffic streams A, B, C and D. The relative allocations are identical for the two schemes shown. However, the scheme of FIG. 1 with the smaller queue-access time yields better performance. The spaced-allocations scheme of FIG. 3 yield better performance for delay-sensitive traffic. In this Figure, each partition is one cell wide. When the number of cells waiting in a queue is less than the limit allocated for the queue, the number of cells transferred from the queue is the lesser of the permissible number and the number of cells waiting in the queue. If the allocations are spread as in FIG. 3, the jitter-performance improves at the expense of a larger number of partitions, and hence increased controller complexity.

The traffic may comprise protected and unprotected streams. The protected streams are promised a specified quality-of-service (QOS) while the unprotected streams must rely on chance (or best effort). One of the main QOS "guarantees" is a delay-jitter bound. When numerous classes with arbitrary sampling frequencies (or intervals) share a link, the sampling instants of two or more classes may coincide and an undesirable sampling frequency modulation becomes unavoidable. The modulation depth may be reduced with appropriate service disciplines and load-level controls.

(a) Rate Control Options

Two rate control disciplines can be realized and are of interest here. The first is the fixed service rate per class, and the second is the guaranteed minimum service rate per class. The former applies to delay-sensitive traffic and the latter applies to delay-tolerant traffic. We consider the manageable case where the sum of the class allocations equals the link rate, and we introduce a complementing NULL class which is allocated any unassigned capacity. In the fixed service rate scheme, idle time slots are given to unprotected traffic streams, thus the protected classes are guaranteed a uniform service rate. In the guaranteed minimum service rate scheme, any unused slots by a given protected class may be given to another protected class. Thus, the service rate for each protected class is at least equal to the allocated service rate. The fixed service rate scheme must be used with delay-sensitive traffic. The guaranteed minimum service rate scheme can introduce jitter and may only be used with delay-tolerant traffic which is sometimes called non-real-time traffic.

(b) Null Class

The sum of the allocated service rates of all classes must be equal to the link rate. When this condition is not satisfied, a null class (e.g. class 0) is introduced and allocated the unused capacity. The null class may donate its time to selected classes.

(c) Two-level Controller

With a fixed service rate per class, the unused time slots may be used by unprotected traffic, e.g., UBR (unspecified bit rate) traffic.

A two-level controller constitutes a fixed service rate (or constant sampling interval) primary controller and a guaranteed minimum service rate (or variable sampling interval) secondary controller. FIG. 4 shows the allocations for the primary controller serving four classes and FIG. 5 the allocations for the secondary controller serving seven classes. Both controllers can allocate null class (class 0). The service periods are shown as contiguous periods for clarity purposes; the actual service slots would be dispersed as in FIG. 3. The primary classes may include CBR traffic or VBR traffic with preserved peak rate or other stringent real-time requirements. A null class in the primary controller may be used to guarantee a minimum service rate for the secondary classes. The secondary classes are for delay-tolerant traffic streams. A null class in the secondary controller may be used to guarantee a minimum (courtesy) service rate for UBR-like traffic. The concept may be extended to a multi-level controller. It is noted that if the secondary classes are to share their unused time slots, their performance difference decreases and they may even behave as a single class.

(d) Weighted Round Robin Scheme: The Generic Implementation

The weighted round robin is the simplest possible implementation of a service rate controller. However, it may have poor delay performance and it is introduced here as a generic scheme for other more involved implementations.

The link is shared by K classes which are assigned service time slices $x_0, x_1, \ldots x_{K-1}$ in a time frame of a maximum duration of $x_0+x_1+ \ldots +x_{K-1}$ time slots. The frame duration would be constant (at maximum value) if each class uses its allocation regardless of the state (idle/busy) of its cell buffer (queue). If the frame scanning continues when an idle class is encountered, then the frame duration is variant.

(e) Sampling Frequency Adjustment to Reduce Jitter

Sampling a delay-sensitive stream at a rate higher than that specified for the stream is generally undesirable since it propagates any previously accumulated jitter to subsequent switching points. Sampling at the proper service rate is particularly useful for CBR streams since it tends to smooth the random period fluctuations. However, a very small sampling frequency increase (e.g., a relative increase of 0.01) improves the performance for two reasons. Firstly, a slight timing error may lead to sampling at a rate lower than that of the cell arrival rate which, in turn, results in buffer overflow. Secondly, with periodic sampling of several CBR classes, the sampling interval for a given class may vary due to conflict with other classes and a small increase in sampling frequency (i.e., a slightly reduced sampling interval) would be useful.

OBJECTS OF THE INVENTION

It is therefore an object of the invention to provide a method of service rate control in an ATM network.

It is a further object of the invention to provide a method of managing multi-class traffic in the network.

It is another object of the invention to provide a method of service-rate control based on frequency domain controls.

It is another object of the invention to provide a method of service-rate control based on time domain controls.

It is yet another object of the invention to provide an apparatus for implementing a high speed class level service-rate controller.

It is yet a further object of the invention to provide an apparatus for implementing a high speed connection level service-rate controller.

It is yet another object of the invention to provide an apparatus for implementing a high speed combined class level and connection level service-rate controller with virtually unlimited capacity, covering a large number of connections.

It is a further object of the invention to provide a robust service rate controller with the capability of self-recovery from errors.

SUMMARY OF THE INVENTION

Briefly stated, according to one aspect, the invention is directed to a method of regulating telecommunication traffic in an ATM network, the telecommunication traffic containing a single class by a service rate in which a class cell buffer is sampled for transmission downstream. The method comprises steps of accumulating, in a class adder, a normalized service rate allocation for the class in each cell period and declaring the class eligible for service when the content of the class adder exceeds unity. The method further includes steps of reducing the class adder content by unity when a cell is dequeued from the class cell buffer and reducing the class adder content by its integer part if the class adder content is greater than unity but the class cell buffer is empty.

According to another aspect, the invention is directed a method of regulating telecommunication traffic containing a single class by service rate in which a class cell buffer is sampled for transmission downstream. The method comprises steps of zero initializing a class status counter, initializing a class adder with the specified service interval for the class and comparing the class adder content with a reference time counter. The method further includes steps of declaring the class eligible for service when the integer part of the class adder content equals the reference time counter, and subsequently increasing the class adder by the value of the specified service interval for the class and increasing the class status counter by unity if the class is eligible for service and the class cell buffer is not empty.

According to yet a further aspect, the invention is directed to a method of regulating telecommunication traffic in an ATM network, the telecommunication traffic containing a single class by a service rate in which a class cell buffer is sampled for transmission downstream. The method comprises steps of initializing an accumulator by a sampling interval for the class and counting a cell period. The method further includes steps of declaring the class eligible for service when the content of the accumulator exceeds the cell period and adding the sampling interval to the content of the accumulator when the class is declared eligible for service.

According to a further aspect, the invention resides in an ATM network handling traffic containing a number of classes of connections in which a class cell buffer for each class is sampled for transmission downstream at a sampling interval. In particular, the invention is directed to a method of regulating the traffic by a prescribed service rate for each class and comprises steps of using a time-space map to indicate a service time for transmission downstream of each connection, a class address being indicative of the service time for each connection and selecting a preferred new class address in the map for a given class by adding the sampling interval of the class to a current map address of the class. The method further includes steps of sequentially searching the time-space map for a free class address, starting from the preferred new class address, choosing the free class address as the class address for the given class and updating the class address in the map whether or not the class is active.

BRIEF DESCRIPTION OF THE DRAWINGS

FIG. 1 is a pie chart showing an example of service time allocations in a 4-class weighted round robin controller;

FIG. 2 is a pie chart showing different allocations for the example of FIG. 1;

FIG. 3 is a pie chart showing spread service times with the same allocations of FIG. 1;

FIG. 4 is a pie chart showing the allocations for delay sensitive primary classes, with a null class allocation to guarantee a minimum service rate for the secondary classes;

FIG. 5 is a pie chart showing the allocations for delay tolerant secondary classes;

FIG. 25 shows an example of a composite stream resulting from the multiplexing of four streams;

FIG. 26 shows the jitter experienced by the individual streams of FIG. 25;

FIG. 34 is a diagram depicting the main operation of the serial time domain controller;

FIGS. 35 and 36 are diagrams showing two successive steps of the operation of the serial time domain controller;

DETAILED DESCRIPTION OF THE PREFERRED EMBODIMENTS OF THE INVENTION

A service rate controller can be designed to satisfy the sampling rate per class or equivalently, the sampling interval per class. While these two options of frequency and time domain controls are functionally equivalent, the hardware implementations can differ substantially. The frequency domain control schemes are suitable for a small or medium number of classes. For a large number of classes, several hundreds for example, time-space mapping associated with time domain control schemes are preferable.

Controller A: Parallel Frequency Domain Control

A.1 Underlying Principles

The basic concepts of the frequency domain controller of the invention are as follows. Let R be the link rate in cells per second and $F_j$ be the required sampling frequency of class j, $0 \leq j < K-1$, such that the total sampling frequency for the K classes is less than R. Let $f_j$ be the normalized sampling frequency of class j:

$$0 < f_j = \frac{F_j}{R} < 1, j = 0, \ldots, K-1, \text{ with } \sum_{j=0}^{K-1} f_j < 1.$$

Figure 6:
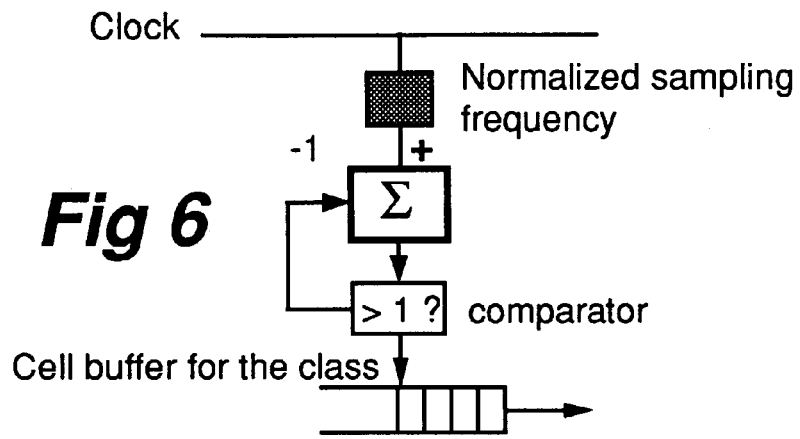
FIG. 6 is a schematic for a single class frequency domain controller.
Figure 7:
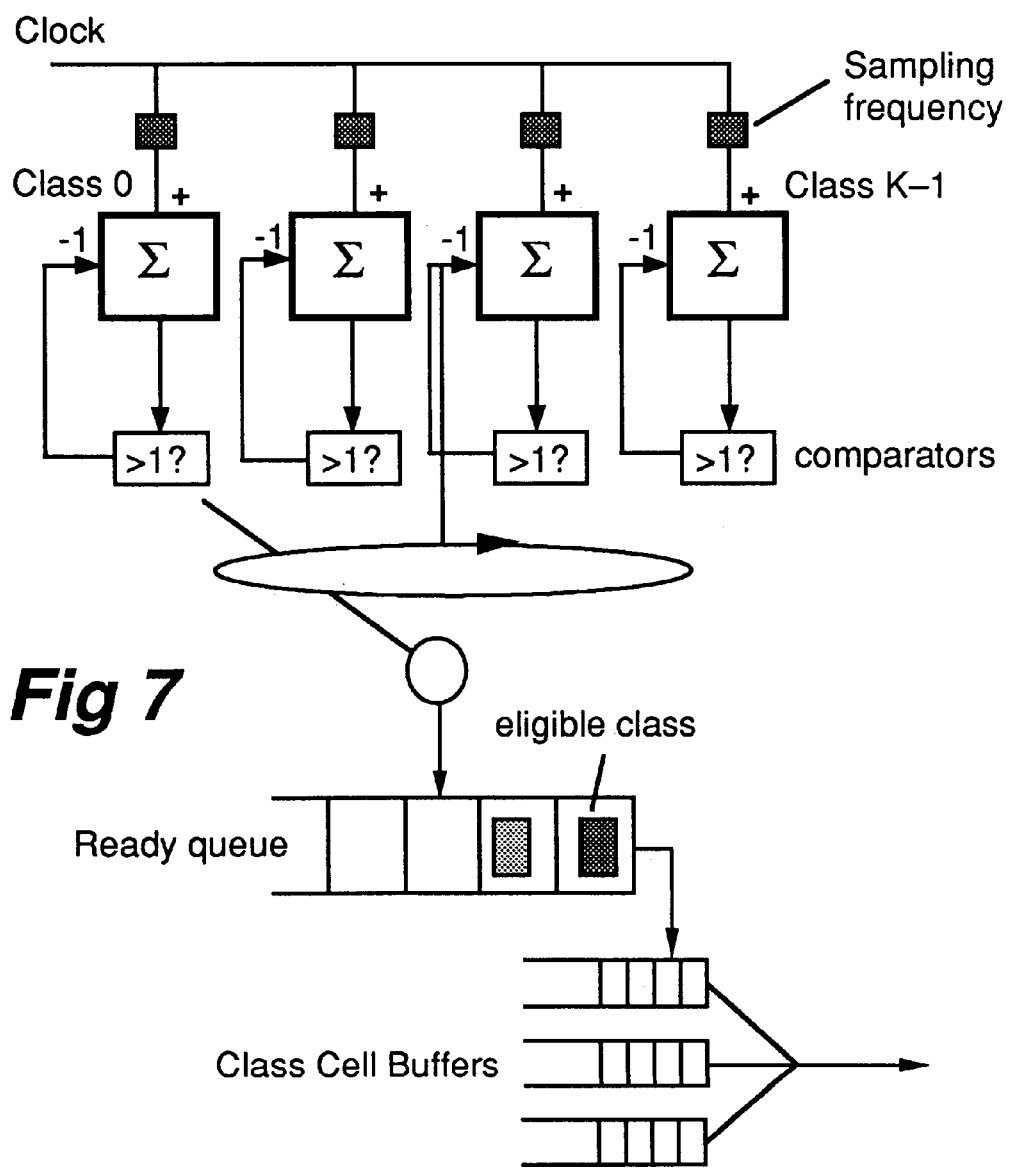
FIG. 7 is a schematic of a multi-class frequency domain controller.

Since the allocated service rate per class is less than the link rate, and since it is not possible to transfer a fraction of a cell at any time, it is necessary to wait for several cell times to be eligible to transfer one or more cells from a given class buffer. Thus, a simple parallel integrator, as shown in FIG. 6, would suffice to indicate when each class is eligible for service. At every clock cycle, a normalized sampling frequency is added. Since the operation is in discrete time, integration is replaced by summation of the normalized sampling frequency. Whenever the summation exceeds unity, the class is served and the sum is reduced by 1.0. FIG. 7 shows the parallel operation of the sampler of FIG. 6 for the cases of K classes. In FIG. 7, when the summation of the frequency allocations for a given class exceeds unity, the summation is reduced by 1.0 even if the class cell buffer is empty. If the class buffer is not empty, the class number is entered in the ready-queue. If the ready-queue is not empty, the class at the head is served. Otherwise, the free slot on the ready queue may be granted to another class of delay-tolerant or unprotected traffic.

The sampling frequencies in FIG. 7 may be updated individually as the need arises, without interrupting the operation of the controller. It is possible to visit the integrators sequentially, two per cell time for example, and enter the eligible active classes in the ready-queue. However, the integrators must operate in parallel.

A.2 Example

As an example, the table below shows the simple arithmetic operation for a case of 8 classes where the sum of class frequency allocations is 0.9999. A class is eligible for service when the integral (summation) of its normalized sampling frequency exceeds unity. The classes are visited in a round robin fashion and the eligible classes are indicated by a dot in the table.

| Discrete time | Normalized sampling frequency | | | | | | | |
|---|---|---|---|---|---|---|---|---|
| | class 0 | 1 | 2 | 3 | 4 | 5 | 6 | class 7 |
| T | | | | | | | | |
| T + 1 | 1.6079 | 1.0100 | .5615 | .4478 | .9347 | 1.0455 | .4532 | .9401 |
| T + 2 | 1.8330 | 1.2134 | .7437 | .5848 | 1.0546 | .1161 | .5007 | .9543 |
| T + 3 | 1.0581 | 1.4168 | .9259 | .7218 | 1.1745 | .1867 | .5482 | .9685 |
| T + 4 | 1.2832 | .6202 | 1.1081 | .8588 | 1.2944 | .2573 | .5957 | .9827 |
| T + 5 | 1.5083 | .8236 | .2903 | .9958 | 1.4143 | .3279 | .6432 | .9969 |
| T + 6 | | | | | | | | |

A.3 Resolution

For precise sampling at the required frequencies, the summation in FIGS. 6 and 7 may be implemented in floating point arithmetic. If integer summation is used, the sampling frequency representation must be rounded up. With a word length of 12 bits or so, the oversampling due to rounding up would be negligibly small. It may even be argued that a slight oversampling is beneficial.

Ideally, the integration interval would be the cell time, i.e., the normalized service rate per class (normalized sampling frequency per class) is added within each cell time. Slower adders may be used by increasing the integration interval to multiple cell times and increasing the integrand accordingly. For example, if the normalized sampling frequency for a given class is 0.20 and the summation is performed each four cell times, then 0.80 is added instead of 0.20. The use of large interval update increases the sampling interval jitter.

Figure 8:
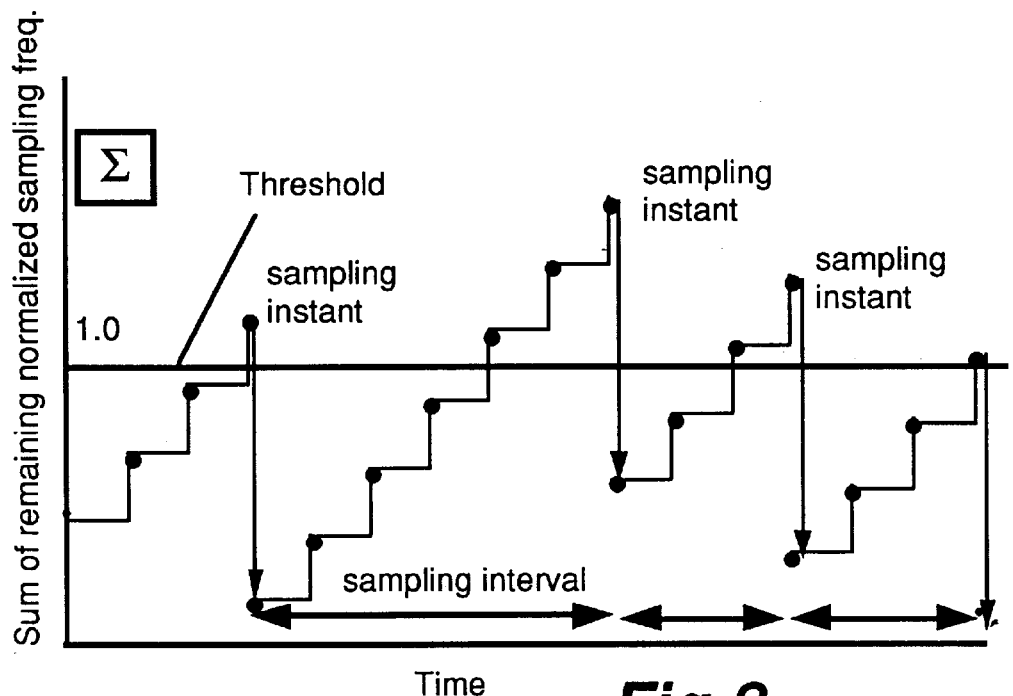
FIG. 8 is a chart depicting the operation of the frequency domain controller with the rate accumulation per cell time.
Figure 9:
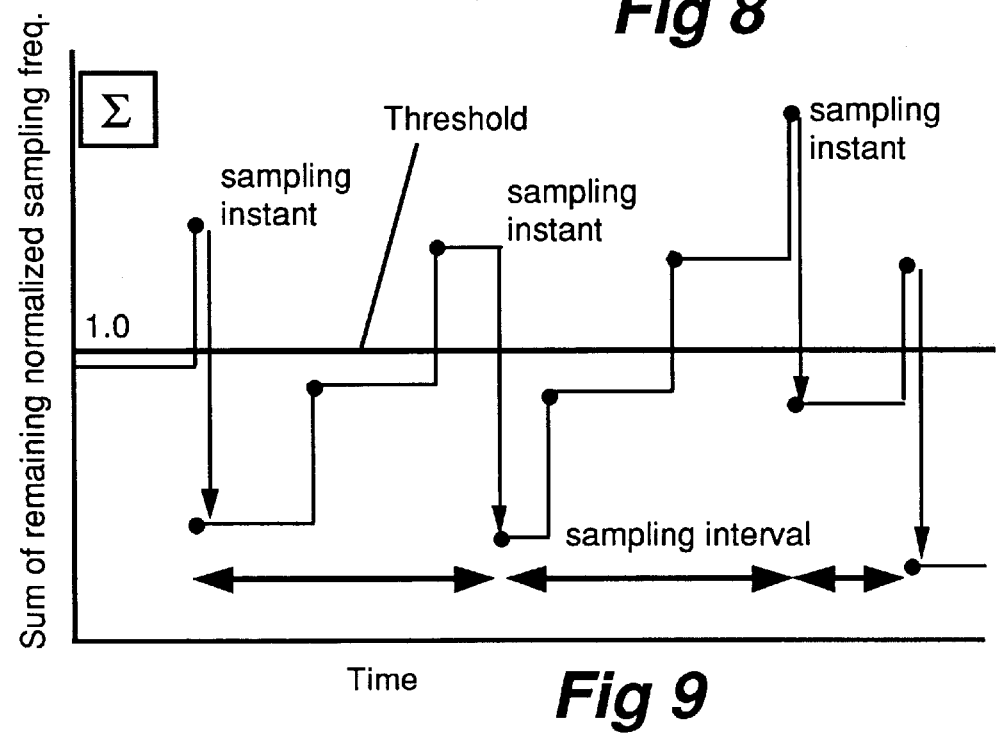
FIG. 9 is a chart depicting the operation of the frequency domain controller with the rate accumulation during every two cell times.

FIG. 8 illustrates the sampling process with fast update where the update takes place every cell interval, and FIG. 9 illustrates the use of a slower update where the summation is performed at half the rate, i.e., every two-cell interval, but with double the increment per update. The vertical step is the normalized sampling frequency in FIG. 8 and double the normalized sampling frequency in FIG. 9. The class buffer may be sampled whenever the summation exceeds unity. Sampling may be delayed when two or more classes are eligible for sampling simultaneously.

A.4 Two-level Implementation

Figure 10:
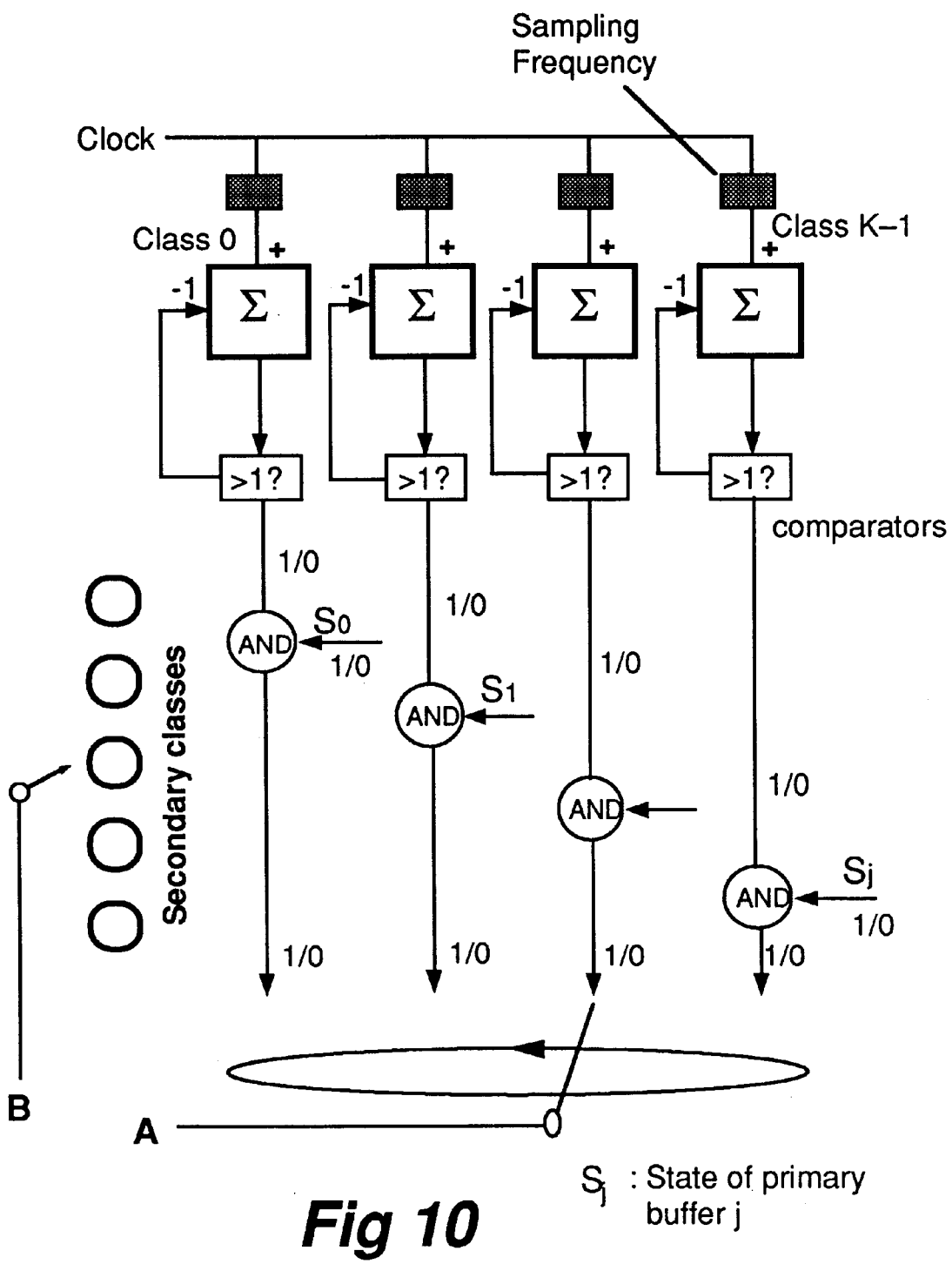
FIG. 10 is a schematic of a two level multi-class frequency domain controller.

A two-level implementation which allows sharing between classes where appropriate may be desirable. The unused time slots in a single-level controller may be shared by other classes controlled by a secondary controller. The unused slots may include those which belong to a null class. The sharing of such slots can be realized by a two-level controller as depicted in FIG. 10. If desired, the unused slots of a given primary class may be made available to another primary class. In other words, a primary class may also appear as a secondary class. It is emphasized, however, that oversampling should not be used for delay-sensitive traffic. FIG. 10 shows four primary classes and the output of the sampler of each primary class k is ANDed with the state of the buffer $S_k$ (0 or 1) to determine the eligibility for sampling. If none of the primary classes is ready, the slot is donated to the secondary classes. If a primary class has a double appearance, i.e., if it also appears as a secondary class, it may still be served during time slots in which it is not eligible for service as a primary class.

A.5 Performance

The performance index of the controller may be defined as the deviation of the actual sampling frequency from the required sampling frequency. Two measures are of interest: the coefficient of variation of the sampling interval and the absolute value of the maximum deviation of the sampling interval. The performance is slightly affected by the mechanism used to serve the eligible classes. In FIG. 7, whenever an eligible class is encountered, it is entered in the shown "ready queue", which is served according to a FIFO discipline. An alternative to queuing is to pick and serve the eligible classes using a fair combinatorial circuit.

Figure 11:
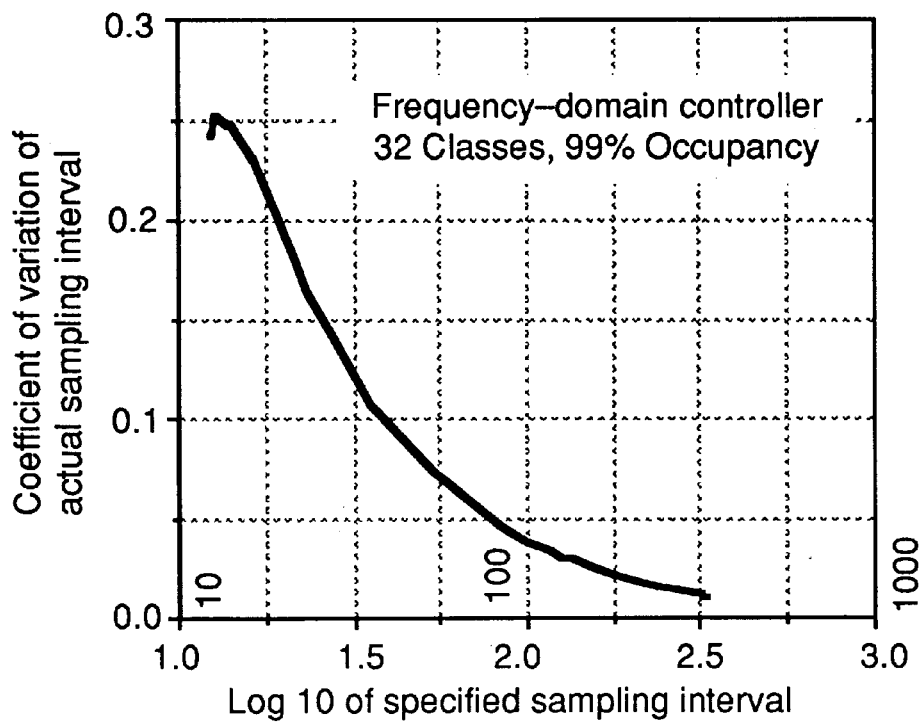
FIG. 11 is a chart showing the coefficient of variation of the actual sampling interval as a function of the specified sampling interval determined by simulating a 32-class frequency domain controller at 99% occupancy.
Figure 12:
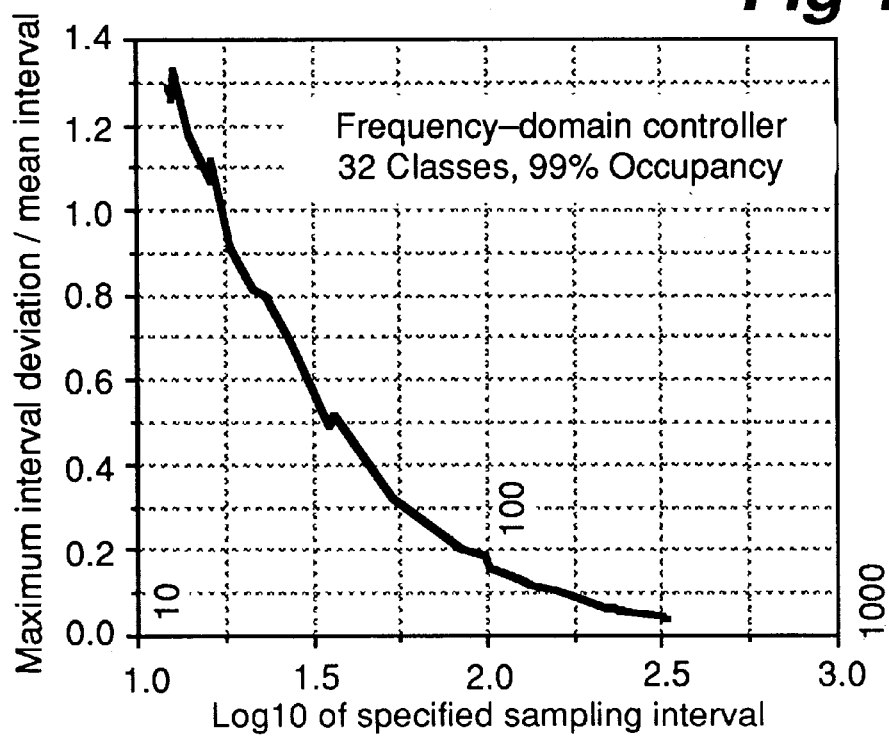
FIG. 12 is a chart showing the coefficient of normalized maximum sampling interval deviation as a function of the specified sampling interval determined by simulating a 32-class frequency domain controller at 99% occupancy.
Figure 13:
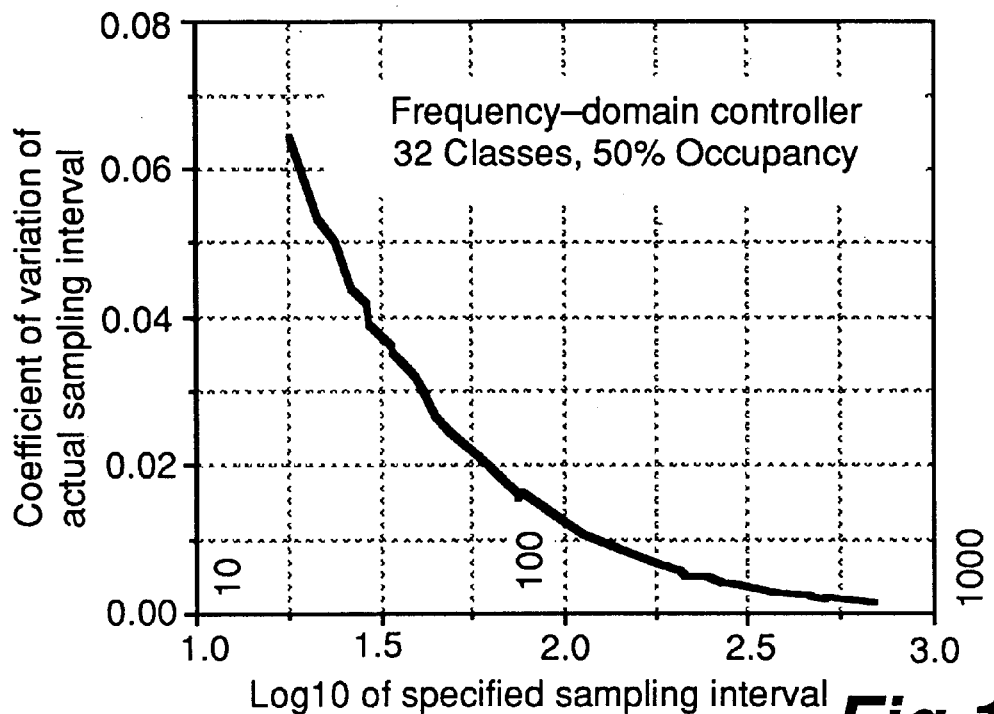
FIG. 13 is a chart showing the coefficient of variation of the sampling interval as a function of the specified sampling interval determined by simulating a 32-class frequency domain controller at 50% occupancy.
Figure 14:
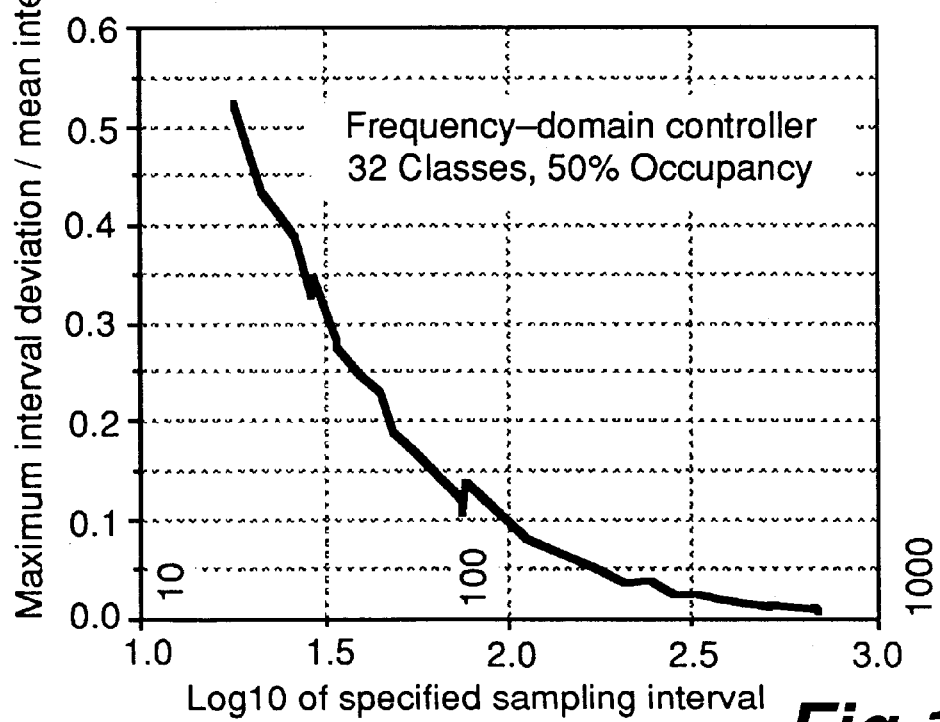
FIG. 14 is a chart showing the coefficient of normalized maximum sampling interval deviation as a function of the specified sampling interval determined by simulating a 32-class frequency domain controller at 50% occupancy.

FIGS. 11 and 12 show the performance indices for a case of 32 classes where the sum of normalized sampling frequency allocations is 0.99 (i.e., the link occupancy is 0.99). FIG. 11 shows the service period (sampling interval) coefficient of variation at full occupancy and FIG. 12 shows the maximum service period (sampling interval) deviation at full occupancy. FIG. 13 shows the service period (sampling interval) coefficient of variation at 50% occupancy and FIG. 14 shows the maximum service period (sampling interval) deviation at 50% occupancy. The sampling interval deviation naturally decreases as the link occupancy decreases. The jitter performance improves as the sampling interval increases. It may also be noted that the performance improves as the total number of classes decreases.

Figure 15:
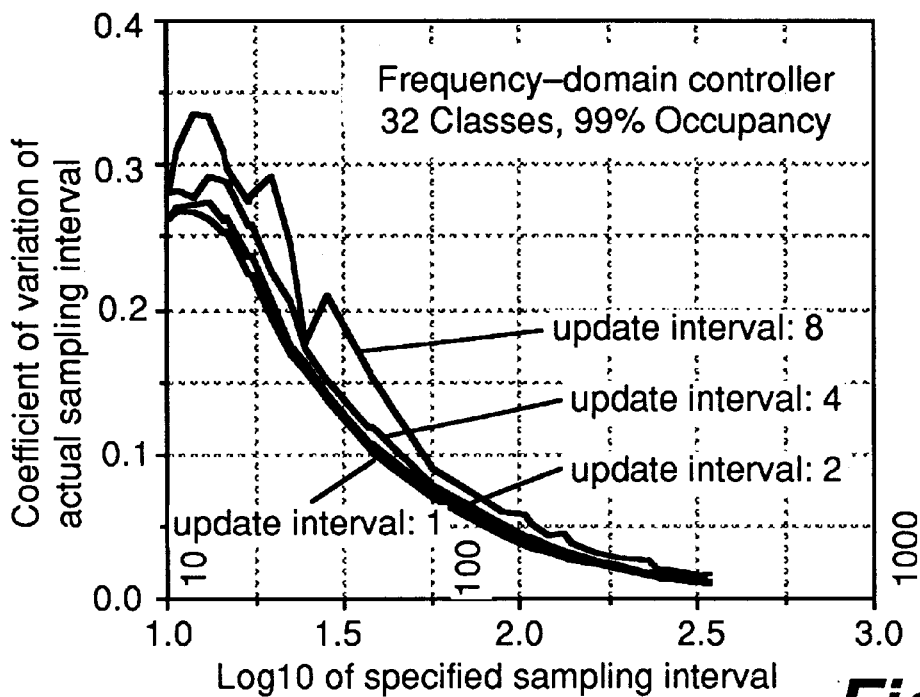
FIG. 15 is a chart showing the coefficient of variation of the sampling interval as a function of the specified sampling interval for a simulated 32-class frequency domain controller at 99% occupancy with the accumulation periods of 1, 2, 4, and 8 cell intervals.
Figure 16:
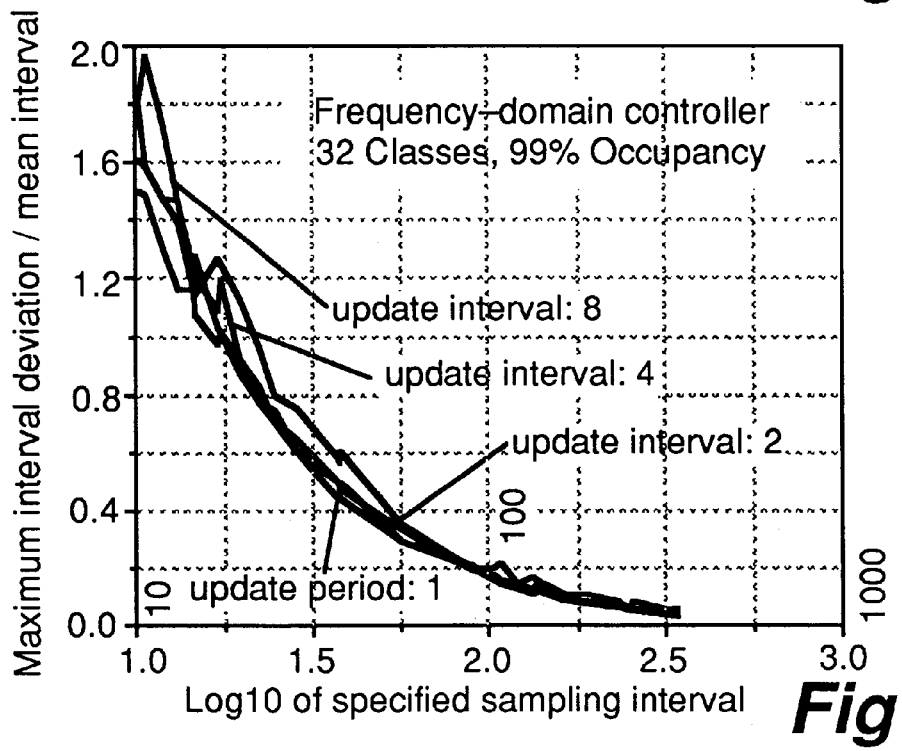
FIG. 16 is a chart showing the maximum normalized deviation of the sampling interval as a function of the specified sampling interval for the same simulation experiment of FIG. 15.

To study the impact of slower update on performance, a 32-class controller, operating at an occupancy of 0.99, was simulated with the update intervals 1, 2, 4, and 8 cell times. The coefficient of variation and relative maximum deviation of the sampling interval are shown in FIGS. 15 and 16, respectively. FIG. 15 shows the dependence of the coefficient of variation of sampling interval on the update interval and FIG. 16 shows the effect of update interval on the maximum deviation of sampling interval. It appears that increasing the update interval by a factor of 4 or less has little effect on performance.

Controller B: Parallel Time Domain Control

B.1 Underlying Principles

Figure 17:
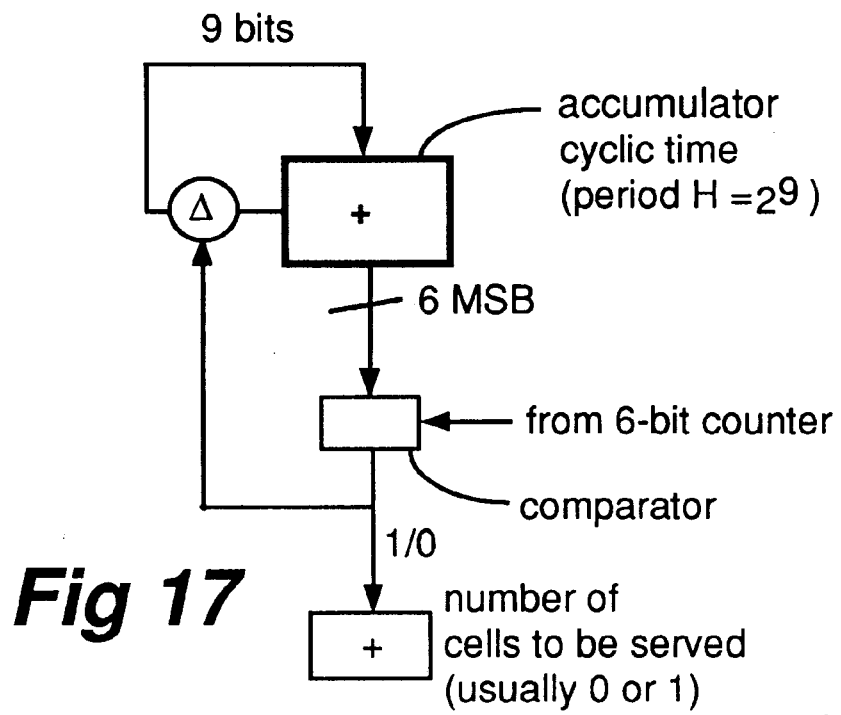
FIG. 17 is a schematic of a single-class time domain controller.

The basic concepts of time domain control are as follows. The controller tries to track the required sampling instants of the traffic streams under consideration. In a simple implementation for a single class, an accumulator is initialized by the sampling interval Δ. When the clock time equals the content of the accumulator, a sampling permit is issued and the value Δ is added to the accumulator content. In FIG. 17, which shows a single-class controller (sampler), if the result of the comparator is 1, the accumulator is enabled and the number of cells to be served is increased by 1. If the class buffer is empty, the number of cells to be served is reduced to zero. To preserve accuracy, the value Δ should be represented by a sufficiently large word length. The time counter, however, may use a smaller number of bits. FIG. 17 shows one embodiment in which a 6-bit counter and 9-bit word length for sampling interval Δ are shown. Let W and w be the word lengths (bits) of the sampling interval and the time counter, respectively. The comparator would use the w most significant bits of the W bit wide accumulator content. The system always works with infinite word length. With the finite word length of the accumulator and the time counter, the period H of the (cyclic) time counter must exceed the sampling interval Δ, otherwise the output of the comparator would always be zero. When the non-empty class buffer is sampled, the number of cells to be served is reduced by 1.

Figure 18:
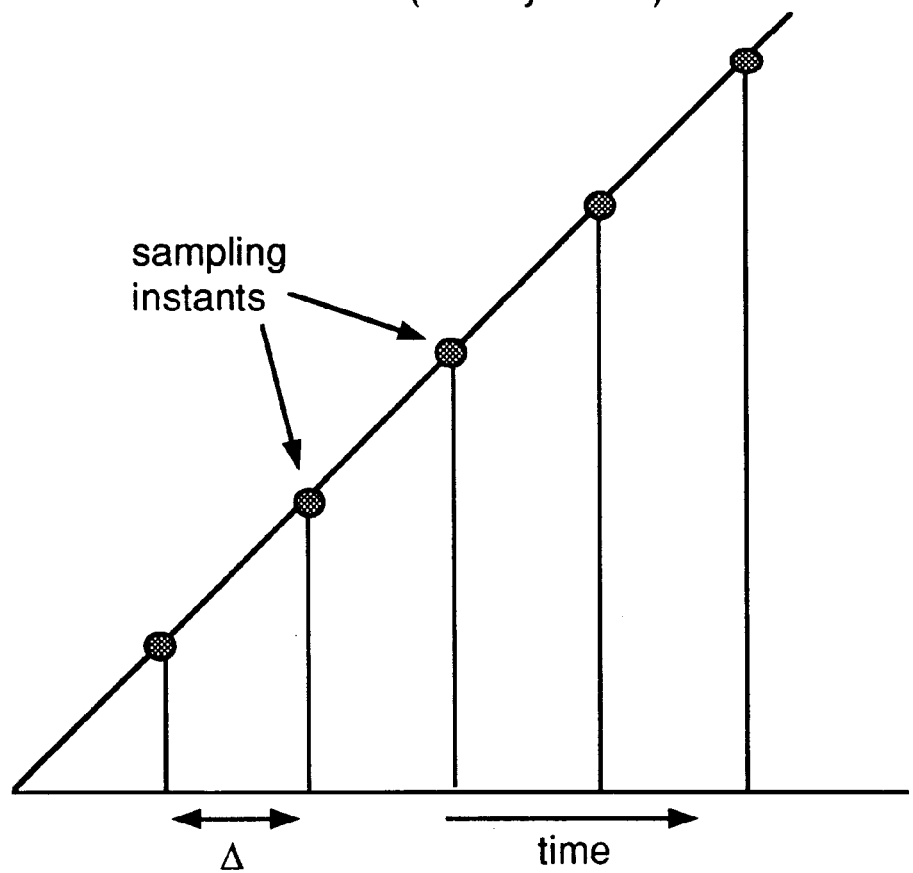
FIG. 18 is a chart showing the sampling instants in a time domain controller with an infinite word length.
Figure 19:
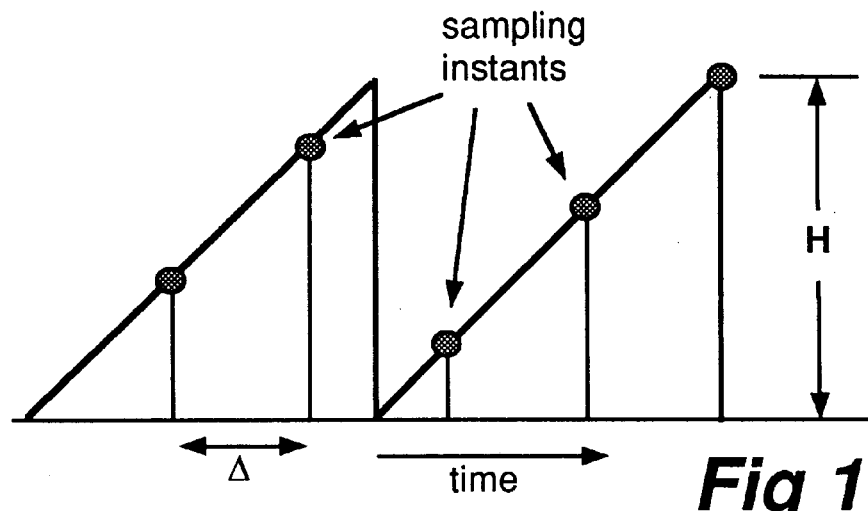
FIGS. 19 and 20 are charts showing the sampling instants in a time domain controller with a finite-word-length adder.
Figure 20:
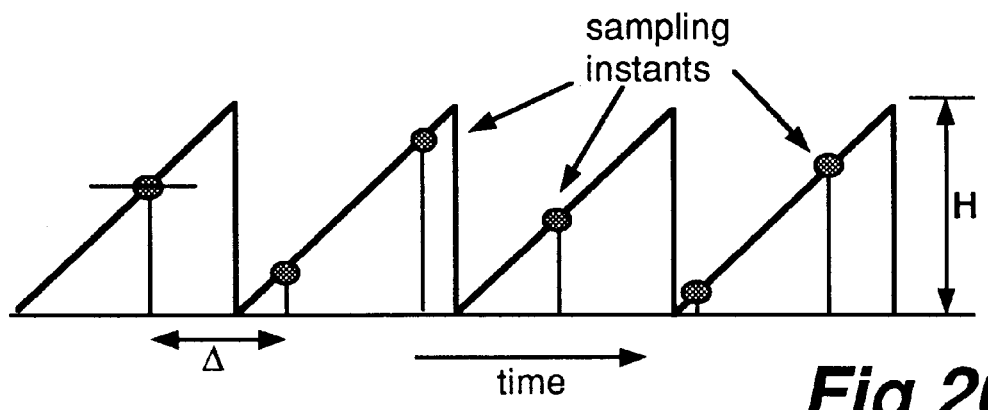
Figure 21:
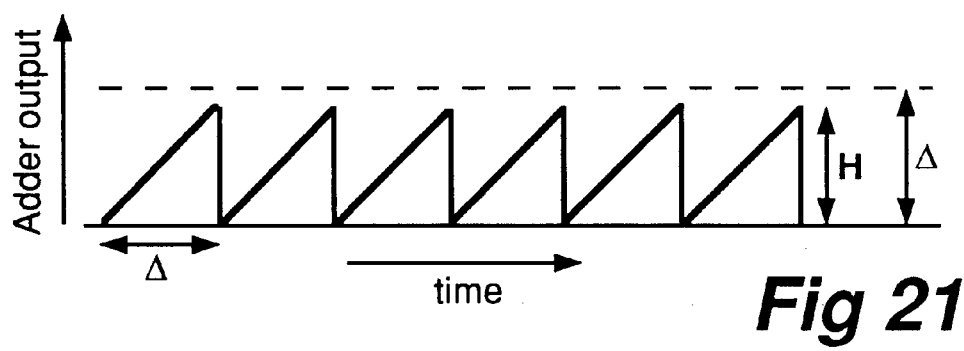
FIG. 21 is a chart showing the condition under which sampling in a time domain controller is not possible.

FIG. 18 shows the operation of a single-class sampler with infinite word length time counters. FIG. 19 shows the effect of finite word length and FIG. 20 shows the effect of a shorter word length. The class is properly sampled as long as H>Δ, where the word length is $\log_2$ H bits. FIG. 21 illustrates the case of insufficient word length when H<Δ, where the sampler ceases to function. The value of H must be greater than the largest sampling interval expected. For example, a 10 bit adder can handle sampling intervals of less than 1024 time slots (cell times). It is important to note that the number of bits in the cyclic time representation determines the quantization error (i.e., the error in representing the required sampling rate), while the number of bits in the comparator determines the sampling range, i.e., the maximum permissible sampling interval.

B.2 Example

Figures 22, 23:
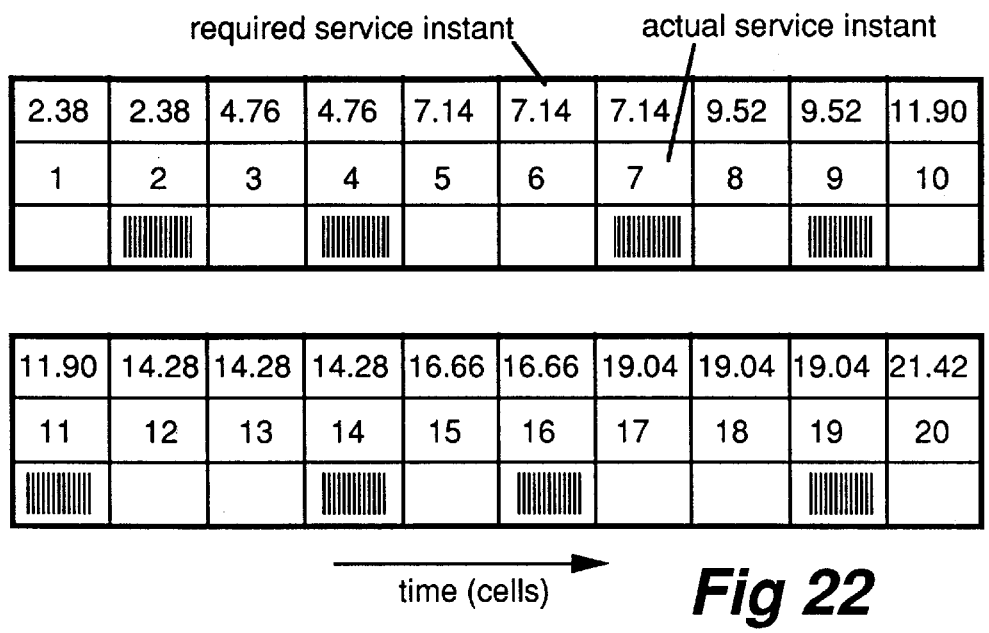
FIG. 22 illustrates the tracking function of the time domain controller.
FIG. 23 illustrates the function of the time domain controller with a finite word length.

As an example, consider the case where the sampling interval of a given class is 2.38 time slots (cell times or cell durations), represented as a real number. FIG. 22 shows the required sampling instant T (of floating point representation) in the top row, and compares it with the integer clock time in the middle row. The instants where the integer part of T equals the clock time are the candidate sampling instants, and are indicated by the shaded slots in the bottom row. Some jitter is produced in the process due to the discrete time operation and the finite word length. This jitter, however, is typically negligible in comparison with the jitter caused by the coincidence of multi-class sampling instants. It is noted that the jitter due to the discrete time operation is common to all service-rate controllers when the desired sampling interval is not an integer multiple of the cell time.

B.3 Resolution: Example of 3-bit Counter 6-bit Adder

As an example of the jitter resulting from a finite word length, FIG. 23 shows the case where the accumulator is 6 bit accurate (W=6) while the time counter is 3 bit accurate (w=3). The sampling instants are shown in heavy type in the first column. The cycle H=$2^3$ is larger than the sampling period Δ=2.38. The horizontal lines in FIG. 23 indicate the sampling instants. The first column in the table indicates the discrete time, the second column shows the cyclic time, and the 6 bit numbers represent the required sampling instants. Scaling by a factor of 8, the value of Δ (2.38), is represented by 19 (binary 010011). This results in oversampling by a factor of (8×2.38/19)−1=0.002. Oversampling can be reduced by using more bits for time representation, e.g., 12 bits instead of 6.

B.4 Parallel Sampler

Figure 24:
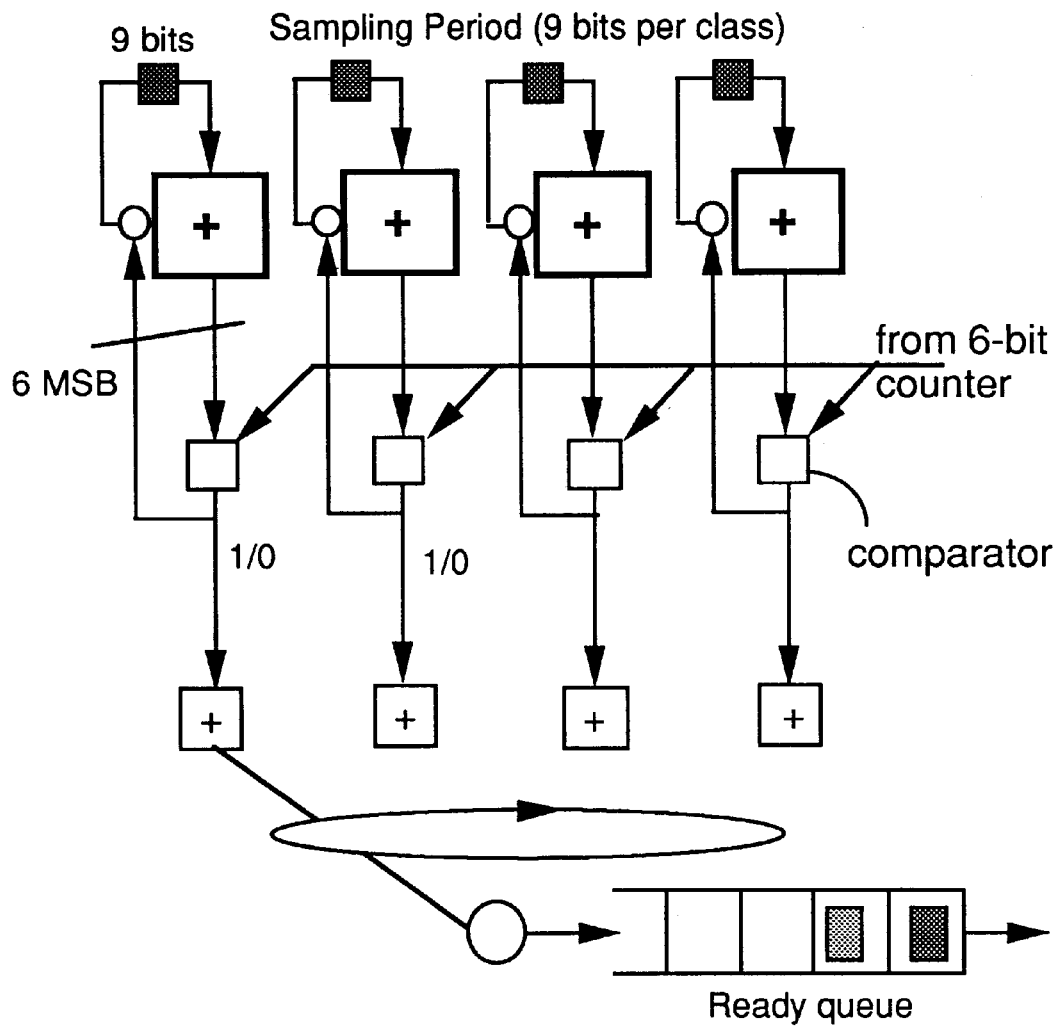
FIG. 24 is a schematic of a multi-class time domain controller.

FIG. 24 shows a number of samplers operating in parallel and independently. A round robin selector may be used to select the nearest class which is ready for service. Alternatively, a FIFO queue may be used to store the numbers of the active classes which are eligible for service.

Note that, during any time slot, two or more classes may be eligible for service. This structure is very simple, fast, and robust, but is suitable only for a medium number of classes (e.g. 32).

B.5 Parallel Sampler Jitter

The sampling jitter for a single class controller is described above. With multi-class sampling, jitter is also produced at the class selection process, when multiple classes are ready for service during a time slot. FIG. 25 shows a parallel sampler (x denotes the unused time slots). In FIG. 25, four classes are to be sampled as shown, and the multiplexing into the composite stream results in added jitter. The overall jitter, however, is negligibly small. FIG. 26 shows the jitter experienced by the individual classes.

B.6 Two-level Implementation

Figure 27:
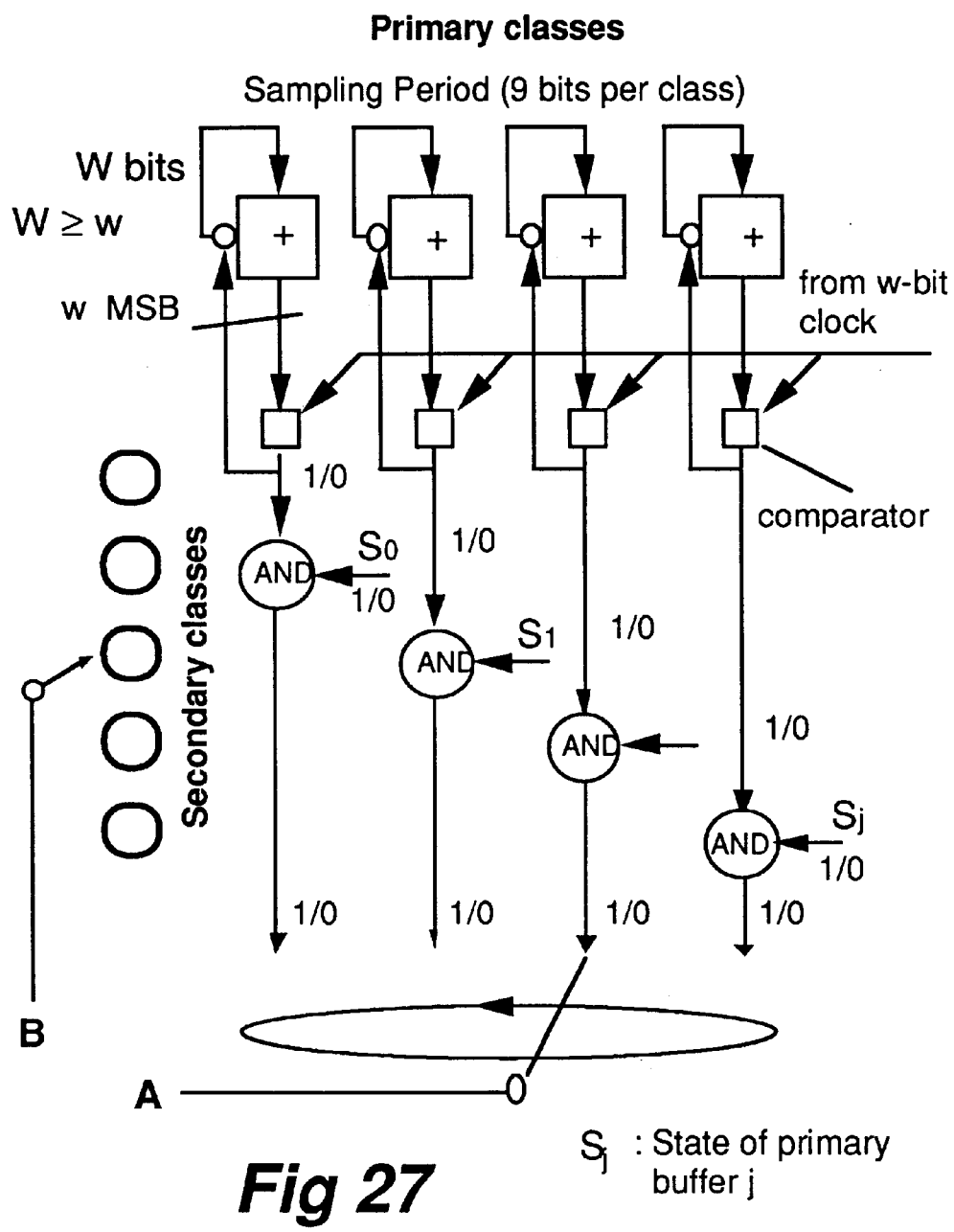
FIG. 27 is a schematic of a two-level multi-class time domain controller.

A two-level implementation of a type-B controller, similar to that of controller-A, may be used as in FIG. 27.

B.7 Performance

Figure 28:
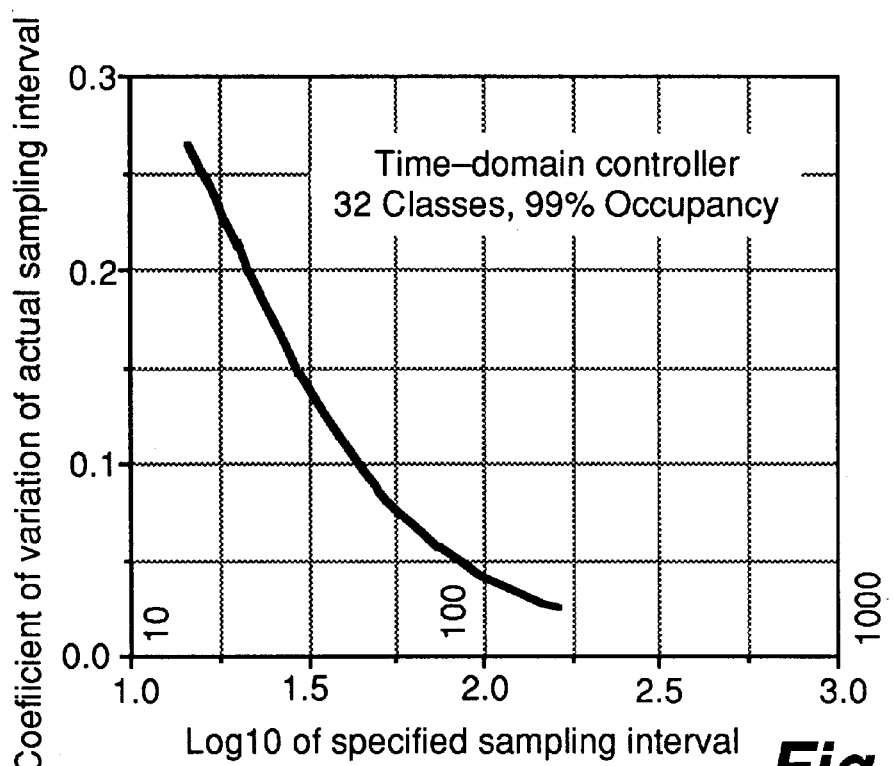
FIGS. 28 and 29 are charts showing the performance of a 32-class time domain controller operated at 99% occupancy.
Figure 29:
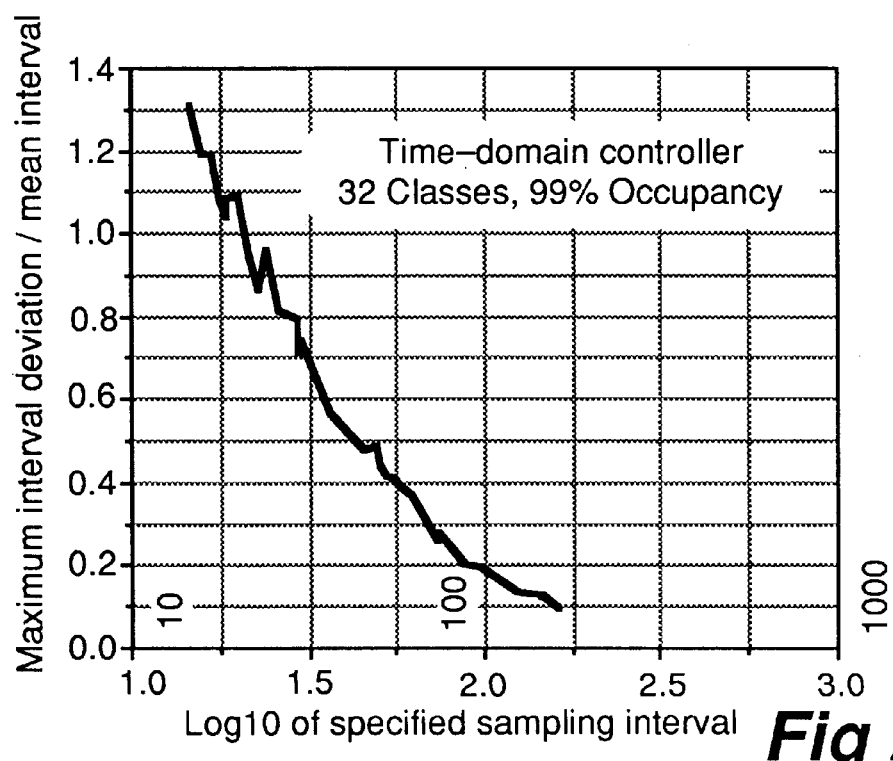
Figure 30:
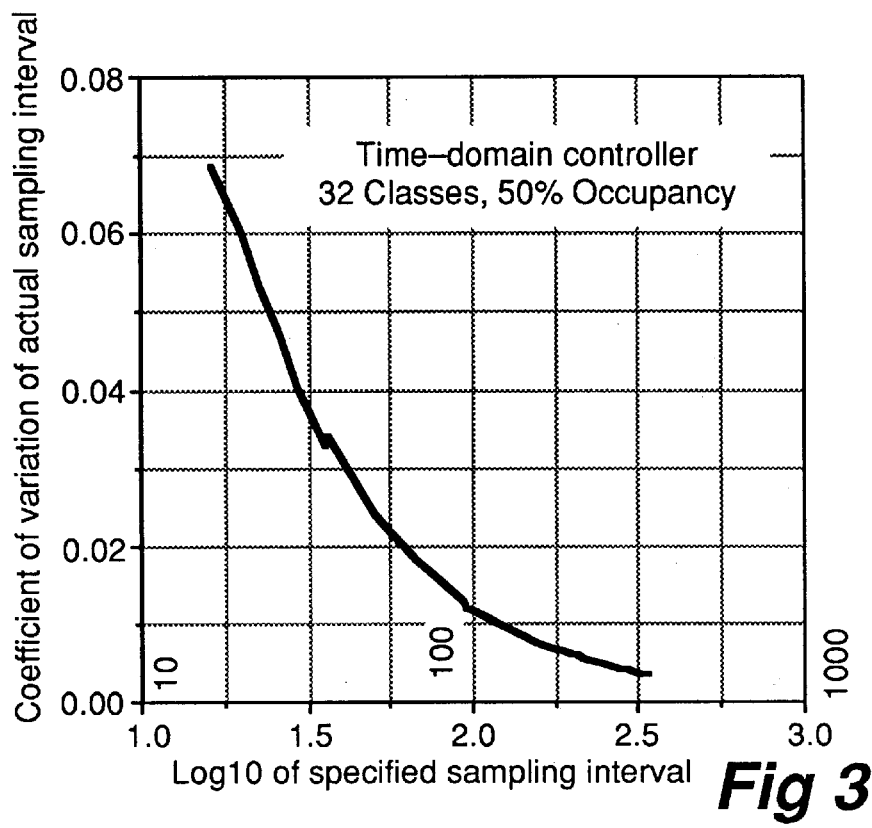
FIGS. 30 and 31 are charts showing the performance of a 32-class time domain controller operated at 50% occupancy.
Figure 31:
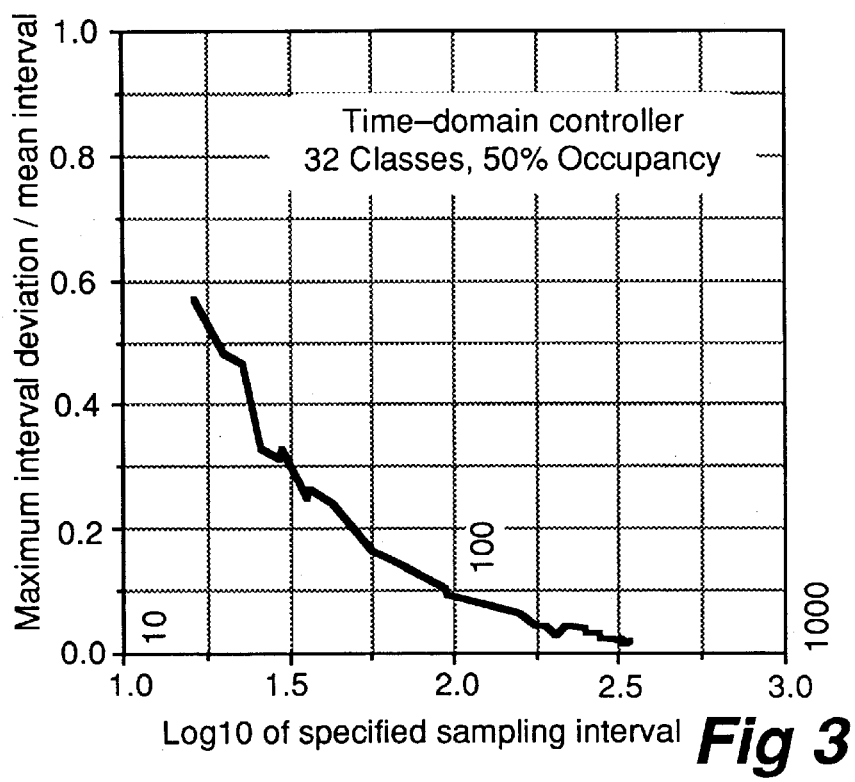

A 32-class controller was simulated over $10^7$ time slots (a time slot is the cell duration). The sampling intervals were selected randomly and normalized so as to yield a given occupancy. FIGS. 28 and 29 show the coefficient of variation and the maximum deviation, respectively, of the actual sampling interval for the case of full occupancy. FIG. 30 shows the service period coefficient of variation at 50% occupancy and FIG. 31 shows the maximum sampling interval deviation at 50% occupancy. The jitter is small as expected. Note that the link portion dedicated to class-controlled traffic is likely to be significantly less than unity (0.5 for example).

Controller C: Serial Time Domain Control

C.1 Underlying Principles

Figure 32:
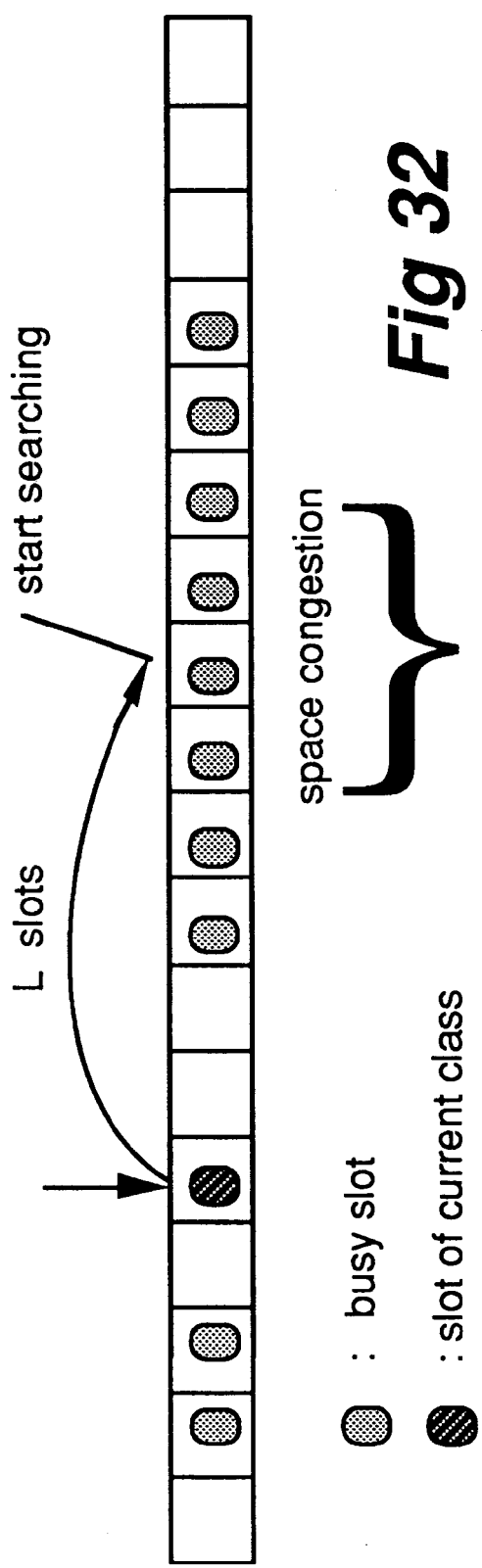
FIG. 32 is a diagram showing the use of time-space mapping for service rate control with one-to-one correspondence between the time slots and space slots.

The basic operation of this controller is explained first. The serial counterpart of the type-B controller would basically be implemented as a simple time-space map in which a new address for a given class is determined by adding the sampling interval of the class to the current address. The map is scanned sequentially and the address update takes place whether or not the class is active. With arbitrary sampling intervals for the different classes, a new address may collide with an already reserved address. The map may then be scanned until a free address is found. This can lead to space congestion with a long train of consecutive busy addresses when the number of classes is large. This pile up of busy addresses in a serial mapping system is shown in FIG. 32 in which the current class is being updated by adding the sampling interval L. Not only is the target space occupied, but nearby spaces are also congested. This results in two difficulties: the delay jitter would be too large and scanning effort per transaction may be too high to be realized within a time slot.

Figure 33:
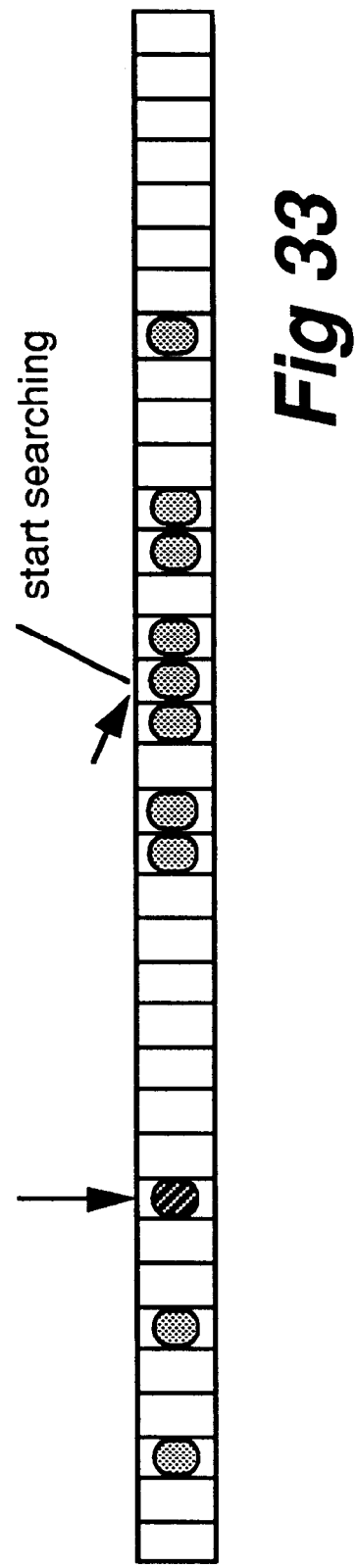
FIG. 33 is a diagram showing the time-space mapping function with expanded space slots.

In FIG. 32, there is a one-to-one correspondence between the time slots and the memory location. The space congestion may be avoided by using a deeper memory (larger map) and scaling the sampling interval accordingly, i.e., the space-time mapping is stretched. For example, doubling the map memory size would require that a sampling interval of 8.24 time slots be stretched to 16.48 address slots. This is depicted in FIG. 33, where a stretch factor of two is used. Note that stretching the time-space map by an integer stretch-factor N, which is greater than unity, results in reducing the map-memory's spatial occupancy by the same factor N, thus improving the performance.

C.2 Implementation Overview

The scheme can be implemented according to the following main steps:

a class-data memory stores the required class-sampling interval Δ and cumulative sampling time T for each class (memory width depends on required resolution);

a ready-class memory (hereafter called memory A) stores class numbers; the memory width is $\log_2$ (rounded up) of the highest number of classes;

a service status memory (hereafter called memory B) stores busy/idle state of memory A (memory B is 1 bit wide);

an adder works in parallel with memory scanning operation to update the value of T; and an imposed scanning limit simplifies timing.

FIGS. 34 and 35 depict two successive steps of the serial tracking operation. For each of the K>0 classes, the class data memory stores the sampling period Δ, as determined by the connection admission control (CAC) process, and the next sampling address T. Memory A stores the numbers of the classes to be served as each address is scanned. For 64000 classes, for example, memory A should be 16-bits wide. The content of memory B (1 bit wide) indicates whether or not the corresponding address in memory A is busy. When memory B indicates that a class is due for service at a given slot, the next address is read from the class-data memory and the next address is updated in the class-data memory. Memory B is not essential and it is introduced only to allow decoupling of the steps requiring access to memory A and hence in speeding up the rate control function.

The dependence of each step on its preceding steps necessitates that sanity checking and error recovery mechanisms be provided. This is discussed in some detail later.

In FIG. 34 at slot 8088, memory B indicated that there is an entry in memory A and the content of memory A at address 8088 indicated that class 1 is eligible for service. The subsequent sampling time of class 1 is read from the class-data memory and is found to be 8119. Memory B is then searched for a vacant entry (an entry containing 0) starting from address 8119. The nearest vacancy was found at address 8120. The class number (1 in this case) is then stored at address 8120 of memory A. The next sampling time of class 1 is calculated as 8119+33 and the number 8152 is stored in the T field of the class 1 data (replacing the previous value of 8119).

In FIG. 35, the following busy address in memory B is 8095 and memory A at this address indicates that class 0 is eligible for service. The sampling period of class 0 is 20 and the next sampling instant corresponds to address 8114. Here address 8114 happens to be vacant. Memory B is marked as address 8114 and the class number (0) is stored in memory A at address 8114. The next sampling time of class 0 is calculated as 8114+20 and the number 8134 is stored in the T field of class 0 (replacing the previous value of 8114).

Figure 36:
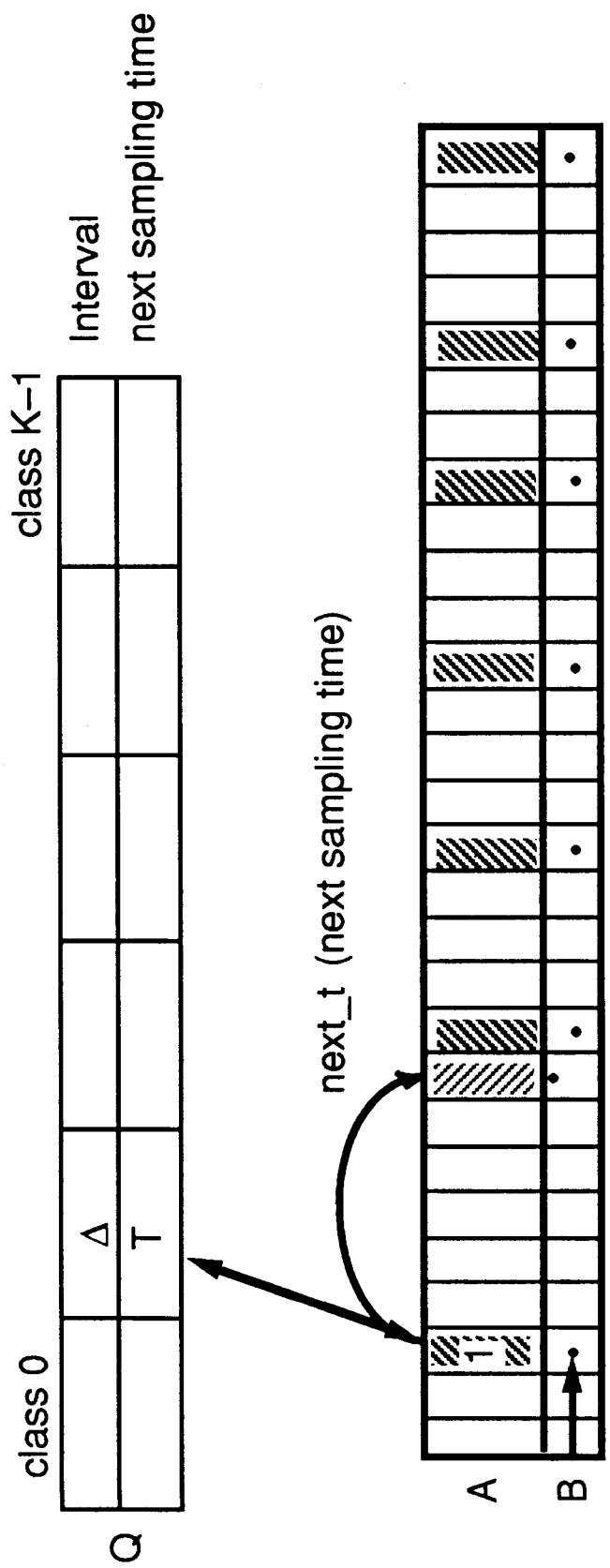

FIG. 36 shows a case where the sampling period of a class is very small. If memory A and memory B are scanned independently, the read pointer of memory B may advance to a busy address before the write address of memory B (or A) is determined by the transaction in progress. This would happen when the sampling period of the previously encountered class is small. To solve this problem, the read address of memory B should be aligned with the write address of memory A if the latter is smaller (while remembering the circular scanning of memories A and B).

Figure 37:
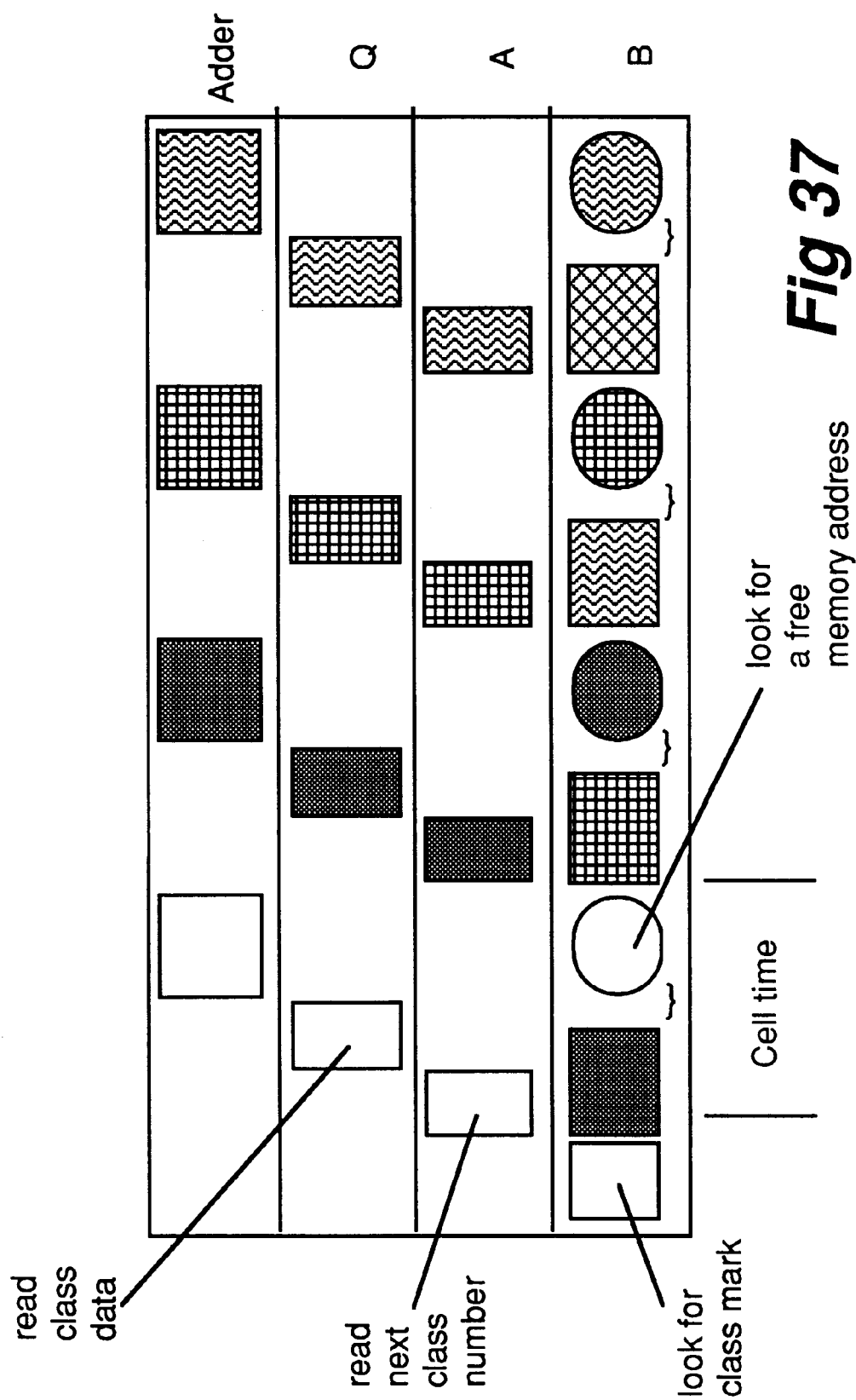
FIG. 37 is a diagram showing the pipelining of the serial time domain controller.

FIG. 37 shows the operations taking place in memory B, memory A, the class-data memory Q, and the adder. There are five basic operations: scanning memory B to look for a mark (a single bit set to 1), reading the class number from memory A, reading the class data from the class-data memory Q to get the desired writing address in memory A, adding to determine the writing address for the next cell of the same class, and scanning memory B to find the nearest free memory address following the desired writing address. These operations would be coordinated to reduce the total processing time per cell.

C.3 Implementation Detail

Figure 38:
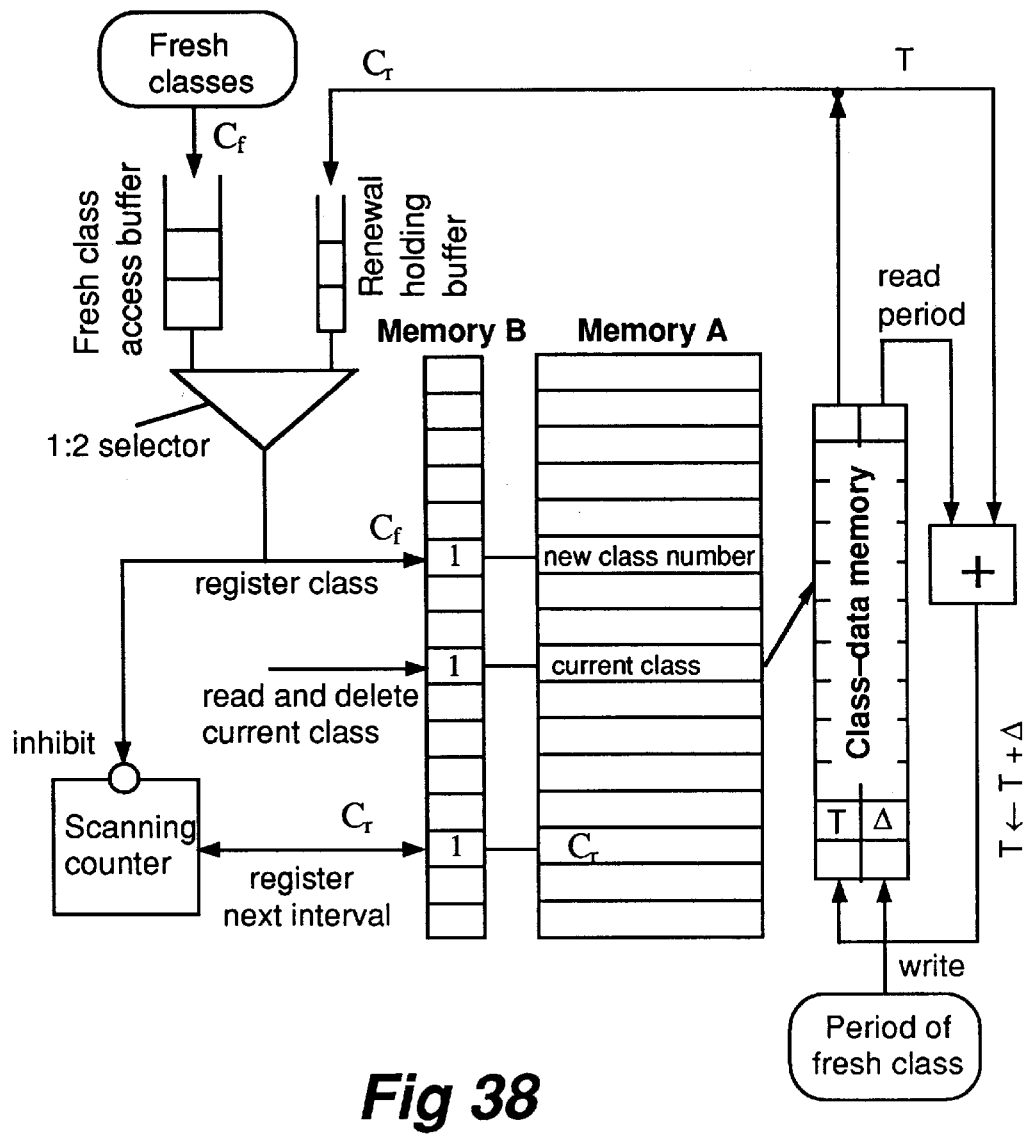
FIG. 38 is a schematic showing the main structure of the serial time domain controller.

An overview of an implementation scheme of a type-C controller is given in FIG. 38. The class-data memory is updated with each fresh class and each class departure. As mentioned earlier, a class may contain one connection or may contain two or more connections. There are two fields in the class-data memory: the sampling period Δ and the next sampling time T (the address of memory A for the class). The classes are assigned serial numbers from 0 to K−1, where K is the total number of classes. A fresh class is registered as follows:

(1) store its sampling period in the Δ field in the class-data memory;

(2) assign an arbitrary instant for its first service time in the T field; a good selection would be the current address plus the sampling interval; and (3) queue the request in the fresh class access buffer, the information associated with the enqueued request includes the class number $C_f$.

When a free address in memory B is found, the class number $C_f$ is stored in the corresponding address in memory A.

The operation of memory A and memory B is as described earlier. Meanwhile, for a class in progress, when T (next sampling time equals current address plus Δ) is determined for this class, the number $C_r$ is stored in memory A at the nearest free address to T, and memory B is marked as busy at that address. Because of a potential coincidence of registration requests attempting to access memory A (and B), a small collector buffer (renewal holding buffer) for renewed classes may be provided. It would be sufficient to have an access buffer for fresh classes only, if an access transaction is allowed to proceed uninterrupted until a vacancy is found in memory B. Otherwise, a small renewal holding buffer for re-registration of admitted classes would be needed. The 1:2 selector shown in FIG. 38 gives priority to the renewal holding buffer to avoid delay jitters for classes in progress.

Figure 39:
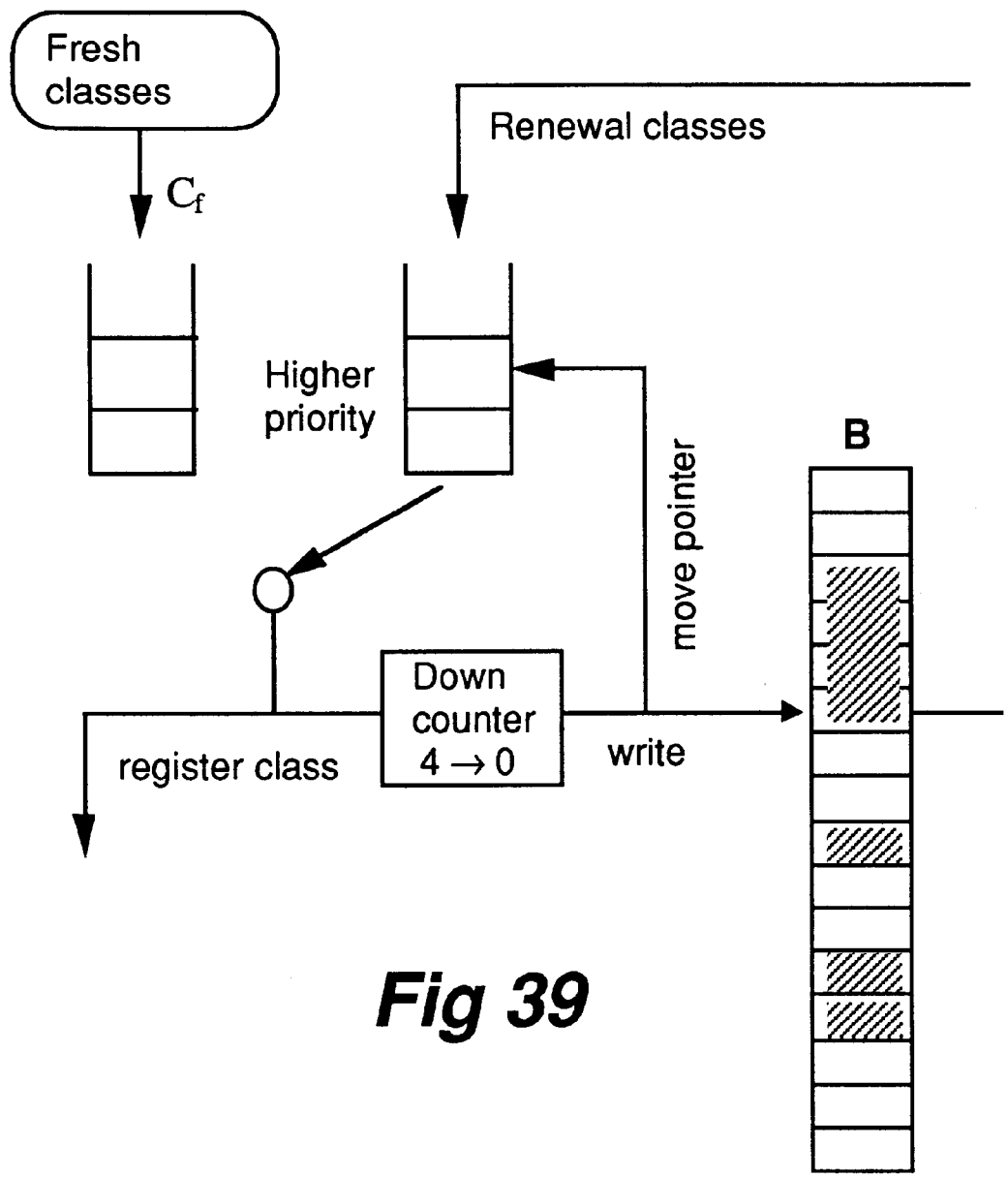
FIG. 39 is a schematic showing the renewed registration of a served class in the serial time domain controller.

To schedule a class, the class number and the nearest address where it can be registered in the time-space map (Memories A and B) is required. A new class can be registered anywhere, and only the class number need be known. New classes admitted by the CAC process are stored in the fresh class access buffer. When a class in progress is read from memory A, it must be rescheduled, i.e., re-entered in the map. This is done by calculating (simple addition) the nearest map address as described above and searching in the forward direction for an empty map slot. Two search methods can be implemented. The first is an exhaustive search where memory B is scanned until a free slot is found. The second is a limited search where the renewal holding buffer is used to store the class and nearest address for the served classes, as shown in FIG. 39. The search effort would be limited to, for example, four slots. If a free slot is not found, the request is placed at the tail of the renewal holding buffer by moving a pointer to the next location. Because of the potentially large variation in search time, some rescheduling requests may be accommodated immediately while others may require several attempts. With an appropriate expansion factor (two or more), the search effort is negligible and the first approach, which is simpler than the second, may be adopted.

It is noted that the arrival rate of re-scheduled requests would be higher by orders of magnitude than the arrival rate of new class requests. The latter, however, should still be given a lower priority in the scheduling process.

Figure 40:
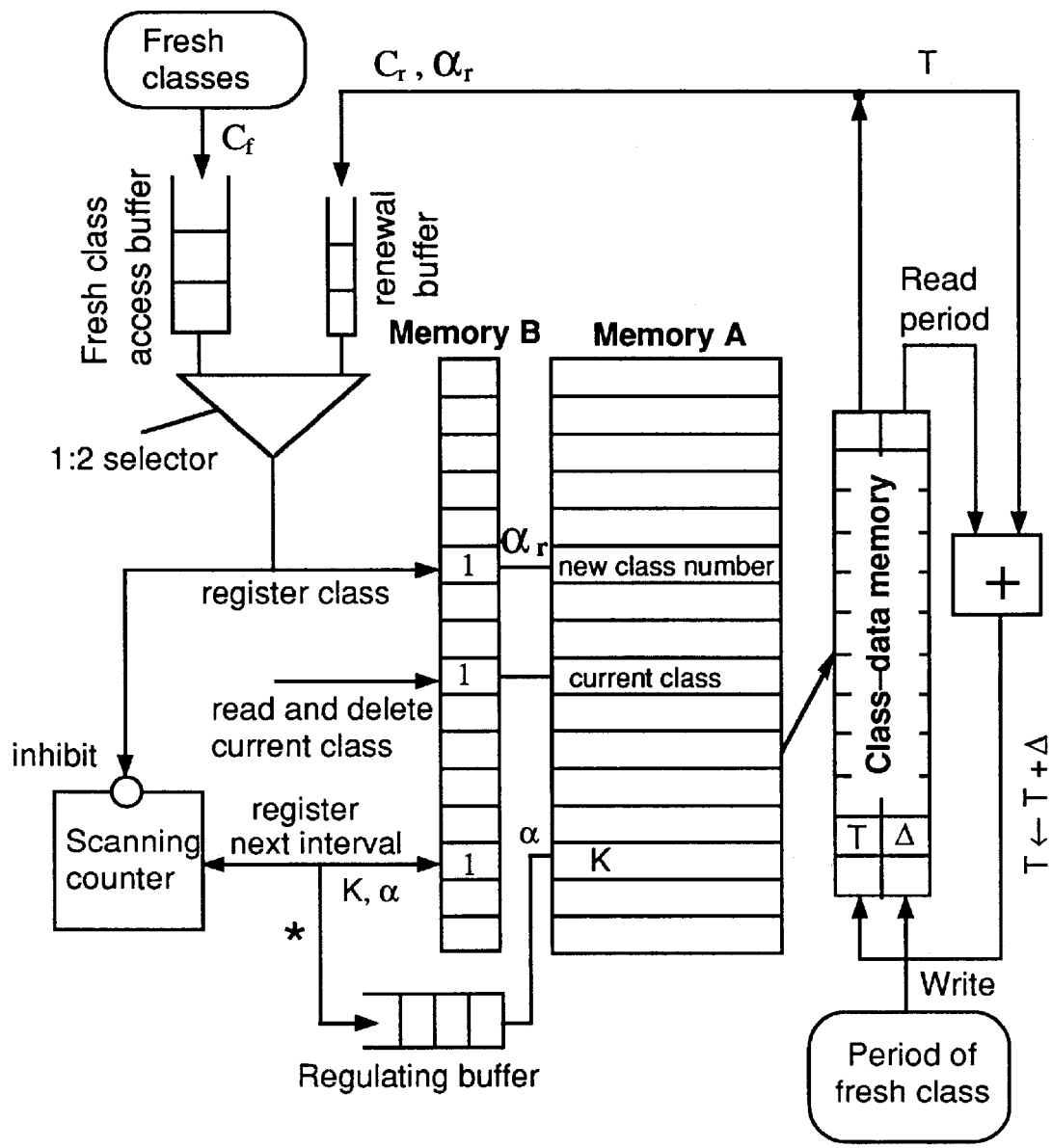
FIG. 40 is a schematic showing the main structure of the serial time domain controller having a regulating buffer.

It is noted that, for the vast majority of registrations (new or renewed), a vacant slot would be found within a very short period if a time-space integer stretch factor greater than unity is used. Therefore, if the search effort was limited to 4 addresses per time slot, then it is plausible that in most cases more than one waiting request would be registered. To exploit this opportunity, a small regulating buffer can be used, as shown in FIG. 40, to register more than one request during one time slot. Referring to FIG. 40, at each time slot, the scanning counter is initialized by a preset limit (e.g., four). Scanning memory B to find an occupied address (i.e., an address storing 1) continues as long as:

(i) the scanning count is positive; and
  (ii) the number of entries in the regulating buffer is below a given threshold (of four or so).

When an occupied address is found in memory B, the corresponding class number is read from the same address in memory A. The address and the class number are stored in the regulating buffer if the class-state memory (not shown in FIG. 40) indicates that the class cell buffer has at least one waiting cell. When not empty, the regulating buffer is dequeued each time slot for servicing. Two pieces of information are read from the regulating buffer: the class number K and its latest address $\alpha$ in memory A (and B). The cell buffer of class K then dequeues one cell and the next address of K is determined by adding the sampling interval of class K to $\alpha$, i.e., by adding the period field $\Delta$ to the T field of class K in the class-data memory.

It is noted that the only purpose of the regulating buffer is to regulate the search effort which can vary widely, from one step to several steps, due to the irregular spatial distribution of the occupied slots in memory B (and A).

C.4 Maintenance and Reliability

In any serial tracking service rate controller a class would become invisible to the controller if it misses just one sampling event due to potential hardware errors. In controller-C, corrective action can easily be taken as follows.

If a class queue is not visited during any time period exceeding a specified threshold, for example, double the specified sampling interval, the class is reinstated as a fresh class with the same class number. Erroneous reinstating of a class results in the class appearing more than once in memory A (and B). This, however, cannot cause any problem (other than a slight waste of memory) since the sampling instants are based on the content of the class-data memory which remains unaware of the duplication. The frequency of the service-sanity verification is arbitrary.

When a class is terminated, the admission control mechanism removes the class data from the class-data memory and refrains from reassigning the same class number to a new request for a period greater than a pre-established threshold (e.g., double the sampling interval of the terminated class).

C.5 Performance

Simulators were developed to study the behaviour of the proposed controllers in isolation. In order to study the effectiveness in the host switch, the controllers must be incorporated in the switch simulator. For this purpose, we used a simulator for a single-stage egress-rate-controlled common-memory switch.

Figure 41:
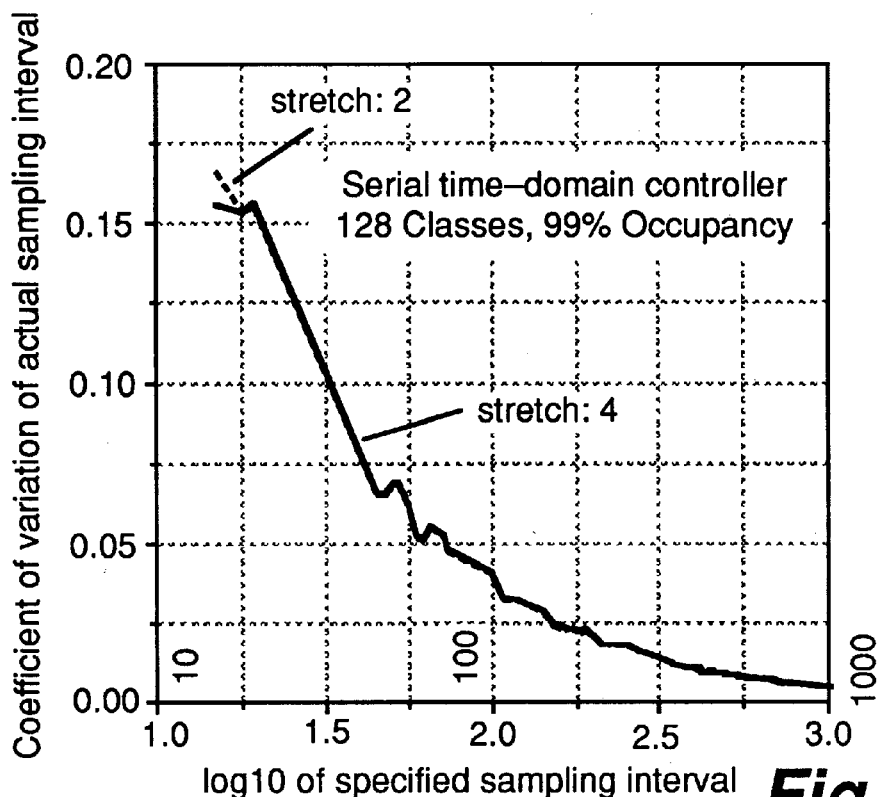
FIGS. 41 and 42 are charts showing simulation results for a 128-class serial time domain controller operated at 99% occupancy with stretch factors of 2 and 4. The performance indices shown are the coefficient of variation and the normalized maximum deviation of the actual sampling interval, each plotted as a function of the specified sampling interval.
Figure 42:
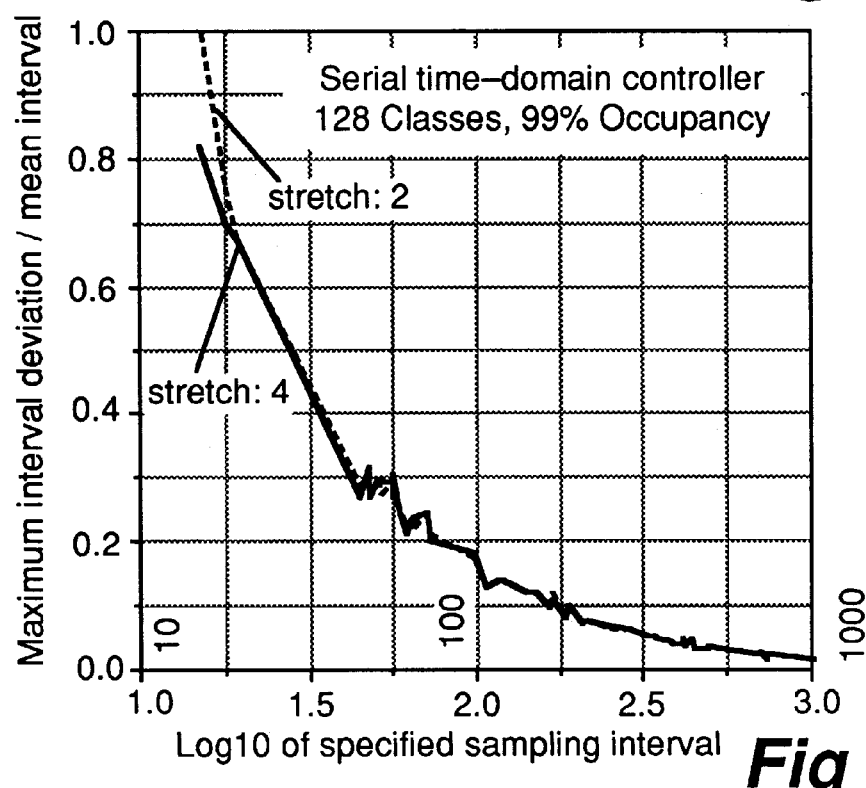

In the simulation, cells from a large number of classes of different sampling intervals are generated and buffered. The intervals are adjusted so that the sum of the sample rates (inverse of sampling intervals) of all classes is equal to the common link rate (normalized to unity). The service is controlled by controller-C and the sampling interval of each cell is recorded. The cell's sampling interval is the difference between consecutive dequeuing times. FIG. 41 shows the coefficient of variation of the sampling interval as a function of the specified sampling interval for the case of 128 classes of sampling intervals varying from 10 to 1000, and with the composite load presenting full loading of the common link. It is seen that the coefficient of variation decreases as the specified sampling interval increases. It is still reasonably small at low values of the specified sampling interval. The difference between using an expansion (stretch) of 2 and 4 is negligible. Hence, an expansion of 2 should suffice. FIG. 42 shows the maximum interval deviation (relative to the mean interval) for the same experiment.

Figure 43:
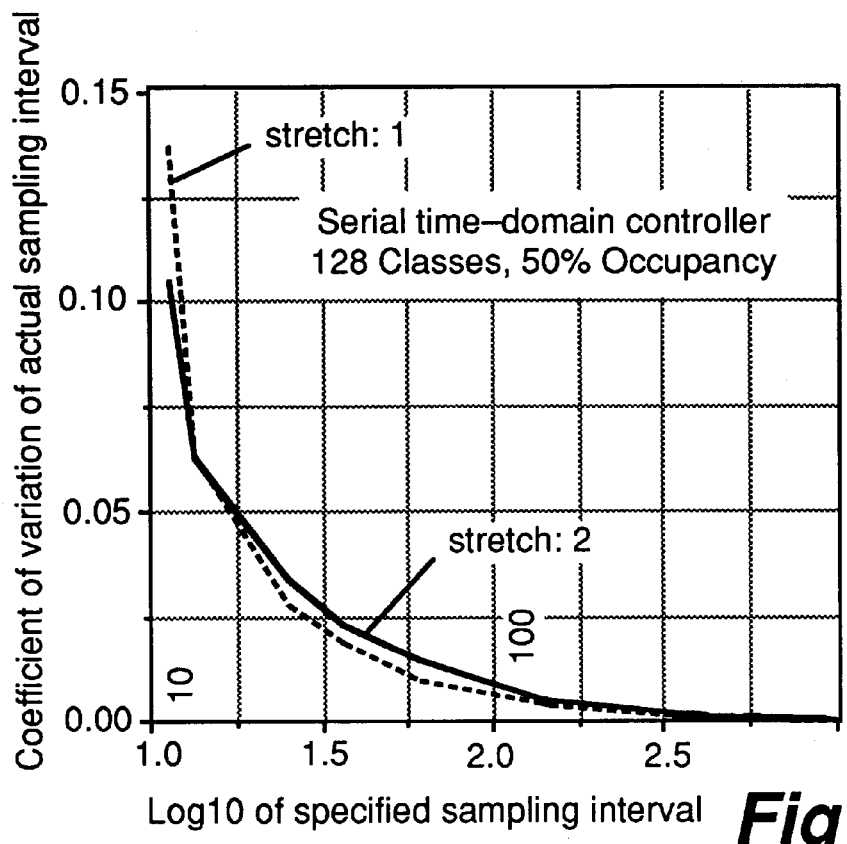
FIGS. 43 and 44 are charts showing simulation results for a 128-class serial time domain controller operated at 50% occupancy with stretch factors of 1 and 2. The performance indices shown are the coefficient of variation and the normalized maximum deviation of the actual sampling interval, each being plotted as a function of the specified sampling interval.
Figure 44:
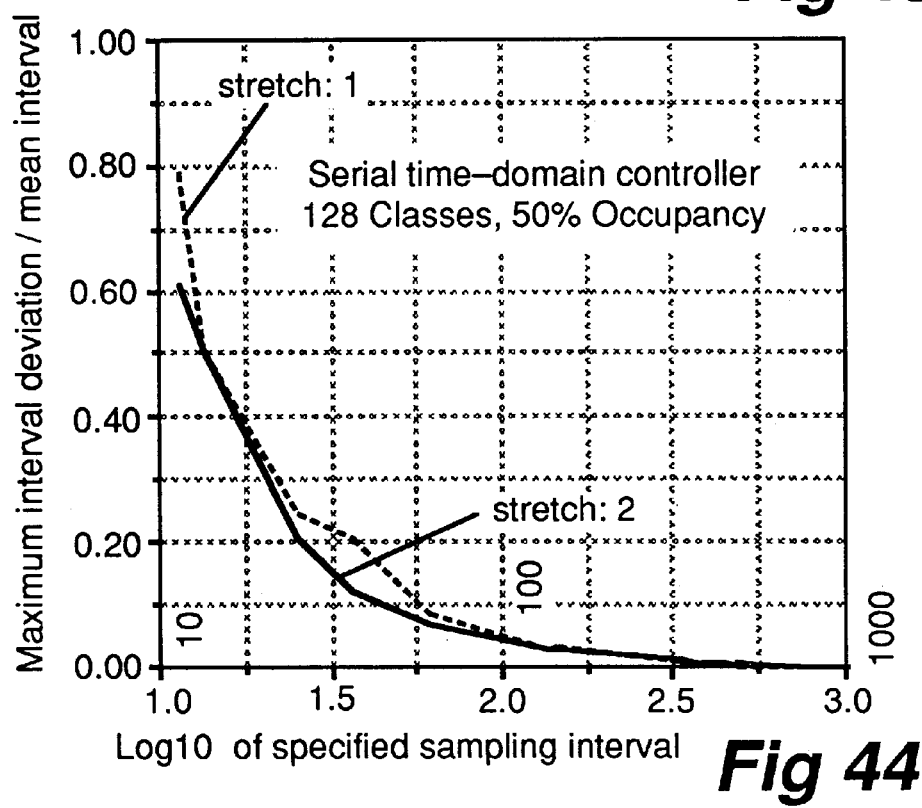

If a type-C controller is used to regulate a fraction of the total traffic load, the jitter performance naturally improves due to lower occupancy of the time-space map. FIG. 43 shows the sampling interval coefficient of variation at 50% occupancy and FIG. 44 shows the maximum sampling interval deviation at 50% occupancy. The performance is good, even without the time-space expansion (i.e., with a stretch factor of 1).

Compound Controllers

Figure 45:
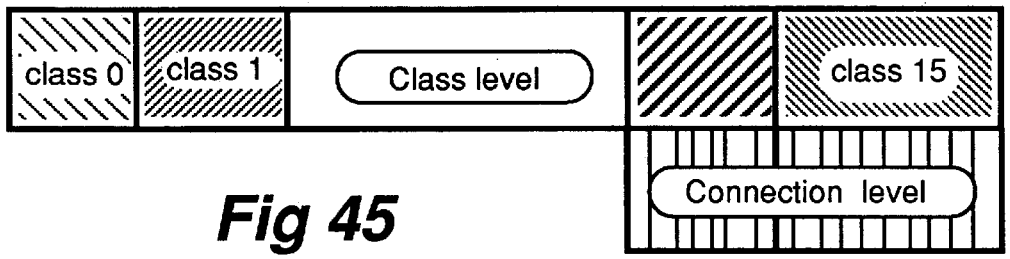
FIG. 45 is a diagram depicting the functional organization of a compound controller.

A compound controller is constructed as a prime controller with a relatively small number of classes and a number of subordinate controllers, each of which may regulate a large number of individual classes. Such an arrangement may provide more flexibility than a single fabric controller. In FIG. 45, a 16-class controller regulates the service rate for each class, according to a fixed-allocation policy or guaranteed-minimum-rate policy. For some classes, the service rate for their individual classes may be further regulated. A type-A or type-B controller may serve as a prime controller due to its simplicity.

Figure 46:
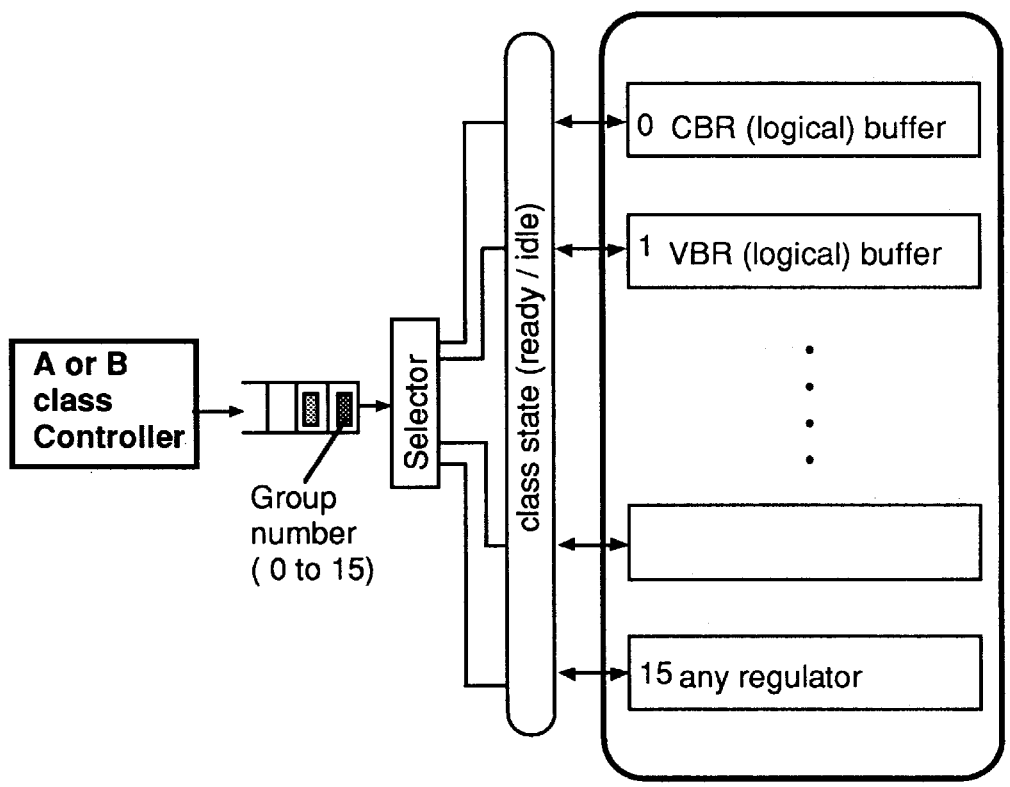
FIG. 46 is a diagram showing the structure of a compound controller.

FIG. 46 shows a schematic of a compound controller driven by a 16 class type-A or type-B controller. Some classes are sampled directly, such as the CBR and VBR classes shown. Other classes, such as class 15, are served by a type-C controller which distinguishes the individual connections within the class. The buffer in FIG. 46 stores the numbers of the classes eligible for service (typically a single entry at any time slot). The class state indicator enables the selector to grant the time slot to an alternative ready-class if the eligible class has no waiting cells. The alternative class would typically be associated with delay-insensitive traffic.

Applications

In a large-scale ATM switching node, class-level rate control is needed within the core and connection-level control is needed in the periphery. Class-level control has stringent speed requirements, which can be realized with controllers A and B. Connection-level control has high capacity requirements which can be realized with controller C.

The following is a summary of different types of controllers:

Controller A, which is a frequency domain controller using parallel integration;

Controller B, which is a time domain controller using parallel tracking; and

Controller C, which is a time domain controller using serial tracking.

Controller C is a serial implementation of Controller B, using the time-space mapping approach.

A qualitative comparison of the above controllers is given in the table below (in the table, the controllers are labelled A, B, and C for brevity):

|  | Characteristics | | | |
| --- | --- | --- | --- | --- |
| Controller | Control | Capacity | Speed | Hardware |
| A | Frequency | Low | Very high | Very simple |
| B | Time | Low | Very high | Simple |
| C | Time | Very high | High | Relatively simple |

What is claimed is:

1. In an ATM network, a method of regulating telecommunication traffic containing a single class by a service rate in which a class cell buffer is sampled for transmission downstream, comprising steps of:

accumulating in a class adder a normalized service rate allocation for the class in each cell period;

declaring the class eligible for service when the content of the class adder exceeds unity;

reducing the class adder content by unity when a cell is dequeued from the class cell buffer; and reducing the class adder content by its integer part if the class adder content is greater than unity but the class cell buffer is empty.

2. The method according to claim 1 wherein the step of accumulating is performed in every K cell period by the amount of the allocated service rate for the class multiplied by the integer K.

3. The method according to claim 1 wherein the telecommunication traffic contains more than one class and the method of regulating the telecommunication traffic is performed in parallel for several classes and each class may be declared eligible for service independently from the others.

4. The method according to claim 3, further comprising a step of serving only one eligible class among any eligible classes for transmission downstream during a cell period.

5. The method according to claim 4 where a combinatorial selector operating in a round robin fashion selects the nearest eligible class during any cell period.

6. The method according to claim 4 wherein the step of serving a class includes steps of:

searching the class cell buffer exhaustively for an eligible class;

queuing the number or address of the eligible class in a ready buffer;

reducing the class adder by unity;

serving the ready buffer on a FIFO basis; and reducing the content of the class adder by its integer part if the class buffer is empty.

7. The method according to claim 6 wherein the scanning to locate an eligible class is limited to a small number of classes per cell period, and the classes are served according to the following steps:

each encountered eligible class during the cell period is entered in the ready buffer;

the class adder for such class is reduced by unity; and the class adder content is reduced by its integer part if the class cell buffer is empty.

8. The method according to claim 1 wherein the sum of the normalized service rate allocations for all classes must be less than unity.

9. The method according to claim 4 wherein the telecommunication traffic containing primary classes for delay sensitive traffic streams and secondary classes for delay-tolerant traffic streams, the step of serving the eligible class of the traffic comprises further steps of:

serving the primary classes by a primary controller;

serving the secondary classes by a secondary controller; and when an eligible primary class has an empty cell buffer, serving additional secondary classes by the secondary controller.

10. The method according to claim 5 wherein the telecommunication traffic containing primary classes for delay sensitive traffic streams and secondary classes for delay-tolerant traffic streams, the step of serving the eligible class of the traffic comprises further steps of:

serving the primary classes by a primary controller;

serving the secondary classes by a secondary controller; and when an eligible primary class has an empty cell buffer, serving additional secondary classes by the secondary controller.

11. The method according to claim 6 wherein the telecommunication traffic containing primary classes for delay sensitive traffic streams and secondary classes for delay-tolerant traffic streams, the step of serving the eligible class of the traffic comprises further steps of:

serving the primary classes by a primary controller;

serving the secondary classes by a secondary controller; and when an eligible primary class has an empty cell buffer, serving additional secondary classes by the secondary controller.

12. The method according to claim 7 wherein the telecommunication traffic containing primary classes for delay sensitive traffic streams and secondary classes for delay-tolerant traffic streams, the step of serving the eligible class of the traffic comprises further steps of:

serving the primary classes by a primary controller;

serving the secondary classes by a secondary controller; and when an eligible primary class has an empty cell buffer, serving additional secondary classes by the secondary controller.

13. The method according to claim 9 where a primary class may also simultaneously appear as a secondary class.

14. In an ATM network, a method of regulating telecommunication traffic containing a single class by a service rate in which a class cell buffer is sampled for transmission downstream, comprising steps of:

zero initializing a class status counter;

initializing a class adder with the specified service interval for the class;

comparing the class adder content with a reference time counter;

declaring the class eligible for service when the integer part of the class adder content equals the reference time counter;

subsequently increasing the class adder by the value of the specified service interval for the class; and increasing the class status counter by unity if the class is eligible for service and the class cell buffer is not empty.

15. The method according to claim 14 wherein the telecommunication traffic contains more than one class and the method of regulating the telecommunication traffic is performed in parallel for several classes, and each class may be declared eligible for service independently from the others.

16. The method according to claim 15 comprising a further step of serving only one eligible class among any eligible classes for transmission downstream during one cell period.

17. The method according to claim 16 wherein a combinatorial selector operating in a round robin fashion selects the nearest eligible class during any cell period.

18. The method according to claim 16 wherein, in one cell period, the step of selecting an eligible class includes steps of:

scanning the class cell buffers exhaustively or until an eligible class is found;

queuing the number or address of the eligible class in a ready buffer;

reducing the class adder by unity; and serving the ready buffer on a FIFO basis.

19. The method according to claim 18 wherein the scanning to locate an eligible class is limited to a small number of classes per cell period, and wherein the step of serving an eligible class includes steps of:

entering each encountered eligible class during the cell period in the ready buffer; and resetting the class adder to zero.

20. The method according to claim 14 wherein the sum over all classes of the inverse service interval designated for each class and expressed in cell units must be less than unity.

21. The method according to claim 16 wherein the telecommunication traffic containing primary classes for delay sensitive traffic streams and secondary classes for delay-tolerant traffic streams, the step of serving the eligible class of traffic comprises further steps of:

serving the primary classes by a primary controller;

serving the secondary classes by a secondary controller; and when an eligible primary class has an empty cell buffer, serving additional secondary classes by the secondary controller.

22. The method according to claim 17 wherein the telecommunication traffic containing primary classes for delay sensitive traffic streams and secondary classes for delay-tolerant traffic streams, the step of serving the eligible class of traffic comprises further steps of:

serving the primary classes by a primary controller;

serving the secondary classes by a secondary controller; and when an eligible primary class has an empty cell buffer, serving additional secondary classes by the secondary controller.

23. The method according to claim 18 wherein the telecommunication traffic containing primary classes for delay sensitive traffic streams and secondary classes for delay-tolerant traffic streams, the step of serving the eligible class of traffic comprises further steps of:

serving the primary classes by a primary controller;

serving the secondary classes by a secondary controller; and when an eligible primary class has an empty cell buffer, serving additional secondary classes by the secondary controller.

24. The method according to claim 19 wherein the telecommunication traffic containing primary classes for delay sensitive traffic streams and secondary classes for delay-tolerant traffic streams, the step of serving the eligible class of traffic comprises further steps of:

serving the primary classes by a primary controller;

serving the secondary classes by a secondary controller; and when an eligible primary class has an empty cell buffer, serving additional secondary classes by the secondary controller.

25. The method according to claim 20 wherein the telecommunication traffic containing primary classes for delay sensitive traffic streams and secondary classes for delay-tolerant traffic streams, the step of serving the eligible class of traffic comprises further steps of:

serving the primary classes by a primary controller;

serving the secondary classes by a secondary controller; and when an eligible primary class has an empty cell buffer, serving additional secondary classes by the secondary controller.

26. The method according to claim 14 where the time counter is of finite word length w and the adder is of finite word length W, with $w \leq W$, and where the w most significant bits of the W-bit wide adder content is compared with the time counter content.

27. The method according to claim 15 where the time counter is of finite word length w and the adder is of finite word length W, with $w \leq W$, and where the w most significant bits of the W-bit wide adder content is compared with the time counter content.

28. The method according to claim 16 where the time counter is of finite word length w and the adder is of finite word length W, with $w \leq W$, and where the w most significant bits of the W-bit wide adder content is compared with the time counter content.

29. The method according to claim 17 where the time counter is of finite word length w and the adder is of finite word length W, with $w \leq W$, and where the w most significant bits of the W-bit wide adder content is compared with the time counter content.

30. The method according to claim 18 where the time counter is of finite word length w and the adder is of finite word length W, with $w \leq W$, and where the w most significant bits of the W-bit wide adder content is compared with the time counter content.

* * * * *